US008200773B2

(12) United States Patent
Bluestone et al.

(10) Patent No.: US 8,200,773 B2
(45) Date of Patent: Jun. 12, 2012

(54) CLIENT-SIDE NETWORK ACCESS POLICIES AND MANAGEMENT APPLICATIONS

(75) Inventors: Derek Bluestone, Haverford, PA (US); Clint Adams, Collegeville, PA (US); Srinivas Yalamarti, Bath, PA (US); Pierre-Philippe Lebel, Malvern, PA (US)

(73) Assignee: Fiberlink Communications Corporation, Blue Bell, PA (US)

( * ) Notice: Subject to any disclaimer, the term of this patent is extended or adjusted under 35 U.S.C. 154(b) by 1078 days.

(21) Appl. No.: 10/490,103

(22) PCT Filed: Sep. 30, 2002

(86) PCT No.: PCT/US02/30936
§ 371 (c)(1),
(2), (4) Date: Jul. 19, 2004

(87) PCT Pub. No.: WO03/027878
PCT Pub. Date: Apr. 3, 2003

(65) Prior Publication Data
US 2005/0022012 A1     Jan. 27, 2005

Related U.S. Application Data

(60) Provisional application No. 60/325,290, filed on Sep. 28, 2001, provisional application No. 60/364,579, filed on Mar. 18, 2002.

(51) Int. Cl.
*G06F 15/16* (2006.01)
(52) U.S. Cl. ........................................ 709/217; 709/227
(58) Field of Classification Search .................. 709/203, 709/217–220, 223, 229, 227
See application file for complete search history.

(56) References Cited

U.S. PATENT DOCUMENTS
5,432,783 A * 7/1995 Ahmed et al. ................ 370/397
(Continued)

FOREIGN PATENT DOCUMENTS
GB          2356765        5/2001
(Continued)

OTHER PUBLICATIONS

"Introduction to Radius", Radius—GNU Project—Free Software Foundation (FSF), 5 pages.

(Continued)

*Primary Examiner* — David Lazaro
*Assistant Examiner* — Marie Georges Henry
(74) *Attorney, Agent, or Firm* — Pepper Hamilton LLP

(57) ABSTRACT

A remote access client is provided for enabling communication between a remote data terminal configured to access a public network, and an enterprise network by way of a VPN tunnel through the public network. The remote access client includes at least one application program interface (API) to receive a first verification of the operating state of a predetermined application of the remote data terminal to enable a connection agent for establishing a point of presence on the public network. Upon connection to the point of presence, the API exchanges data between the remote access client and the predetermined application of the remote data terminal. The remote access client receives a second periodic verification of the operating state of the predetermined application via the API for terminating the connection to the point of presence upon the absence of the second verification. The point of presence enables the VPN tunnel for transporting data from the remote data terminal to the enterprise network across the public network.

21 Claims, 24 Drawing Sheets

U.S. PATENT DOCUMENTS

| | | | |
|---|---|---|---|
| 5,666,411 A | | 9/1997 | McCarty |
| 5,673,322 A | | 9/1997 | Pepe et al. |
| 5,732,074 A | | 3/1998 | Spaur et al. |
| 5,905,782 A | * | 5/1999 | Lee et al. ............... 379/100.01 |
| 5,987,611 A | | 11/1999 | Freund |
| 6,011,560 A | | 1/2000 | Stiles |
| 6,012,100 A | * | 1/2000 | Frailong et al. ............... 709/250 |
| 6,061,650 A | | 5/2000 | Malkin et al. |
| 6,070,243 A | * | 5/2000 | See et al. ............................. 726/2 |
| 6,078,586 A | * | 6/2000 | Dugan et al. ............... 370/395.2 |
| 6,081,508 A | | 6/2000 | West et al. |
| 6,092,113 A | * | 7/2000 | Maeshima et al. ........... 709/230 |
| 6,151,628 A | | 11/2000 | Xu et al. |
| 6,185,609 B1 | * | 2/2001 | Rangarajan et al. .......... 709/219 |
| 6,212,636 B1 | | 4/2001 | Boyle et al. |
| 6,253,327 B1 | | 6/2001 | Zhang et al. |
| 6,330,562 B1 | * | 12/2001 | Boden et al. ..................... 707/10 |
| 6,377,982 B1 | | 4/2002 | Rai et al. |
| 6,453,035 B1 | | 9/2002 | Psarras et al. |
| 6,493,349 B1 | | 12/2002 | Casey |
| 6,539,482 B1 | | 3/2003 | Blanco et al. |
| 6,643,782 B1 | | 11/2003 | Jin et al. |
| 6,654,891 B1 | | 11/2003 | Borsato et al. |
| 6,694,437 B1 | | 2/2004 | Pao et al. |
| 6,732,270 B1 | | 5/2004 | Patzer et al. |
| 6,748,543 B1 | | 6/2004 | Vilhuber |
| 6,751,729 B1 | | 6/2004 | Giniger et al. |
| 6,760,444 B1 | | 7/2004 | Leung |
| 6,766,453 B1 | | 7/2004 | Nessett et al. |
| 6,778,498 B2 | | 8/2004 | McDysan |
| 6,785,823 B1 | | 8/2004 | Abrol et al. |
| 6,832,313 B1 | * | 12/2004 | Parker .......................... 713/150 |
| 6,850,943 B2 | | 2/2005 | Teixeira et al. |
| 6,874,139 B2 | | 3/2005 | Krueger et al. |
| 6,968,321 B1 | * | 11/2005 | Yu .................................... 705/43 |
| 7,099,947 B1 | * | 8/2006 | Nadeau et al. ................. 709/229 |
| 7,124,183 B2 | * | 10/2006 | Pekary et al. ................. 709/224 |
| 7,444,398 B1 | * | 10/2008 | Matthews ..................... 709/224 |
| 2002/0138756 A1 | | 9/2002 | Makofka et al. |
| 2002/0199203 A1 | | 12/2002 | Duffy et al. |
| 2003/0028650 A1 | * | 2/2003 | Chen et al. .................... 709/229 |
| 2003/0074580 A1 | | 4/2003 | Knouse et al. |
| 2003/0105978 A1 | | 6/2003 | Byrne |
| 2003/0135611 A1 | | 7/2003 | Kemp et al. |
| 2004/0005886 A1 | | 1/2004 | Oda et al. |
| 2004/0054794 A1 | * | 3/2004 | Lantto et al. .................. 709/229 |
| 2004/0088565 A1 | | 5/2004 | Norman et al. |
| 2004/0107360 A1 | | 6/2004 | Herrmann et al. |
| 2004/0123162 A1 | | 6/2004 | Antell et al. |
| 2004/0193907 A1 | | 9/2004 | Patanella |
| 2004/0221174 A1 | | 11/2004 | Le Saint et al. |
| 2005/0015622 A1 | | 1/2005 | Williams et al. |
| 2005/0033596 A1 | | 2/2005 | Tummolo |
| 2005/0044418 A1 | | 2/2005 | Miliefsky |
| 2005/0060537 A1 | | 3/2005 | Stamos et al. |
| 2005/0132225 A1 | | 6/2005 | Gearhart |
| 2005/0138408 A1 | | 6/2005 | Vanover et al. |
| 2005/0144475 A1 | | 6/2005 | Sakaki et al. |
| 2005/0154885 A1 | | 7/2005 | Viscomi et al. |
| 2005/0166065 A1 | | 7/2005 | Eytchison et al. |
| 2005/0172142 A1 | | 8/2005 | Shelest et al. |
| 2005/0188065 A1 | | 8/2005 | O'Rourke et al. |

FOREIGN PATENT DOCUMENTS

| | | |
|---|---|---|
| JP | 2002-314582 | 10/2002 |
| WO | 99/44339 | 9/1999 |

OTHER PUBLICATIONS

"Virtual Private Networking in Windows 2000: An Overview", Microsoft Windows 2000 Server (1999) 28 pages.

"Wi-Fi Security at Work and on the Road", 5 page.

Davies, Joseph "Radius Protocol Security and Best Practices", Microsoft Windows 2000 Server (Jan. 2002) 16 pages.

Novell eDirectory 8.7 Quick Look, http://www.novell.com/products/edirectory/quicklook.html, 2 pages.

Novell eDirectory, Directory Services, Technical White Paper, www.novell.com, total 23 pages.

Novell Secure Login Features and Benefits, http://www.novell.com/products/securelogin/features.html, 2 pages.

Novell Secure Login Quick Look, http://www.novell.com/products/securelogin/quicklook.html, 2 pages.

Carugi, M.; France Telecom; McDysan, M.; Worldcom; Fang, L.; AT&T; Johansson F.; Telia; Ananth Nagarajan; Sprint; Sumimoto, J.; NTT; Wilder, R.; Zephion Networks, "Service requirements for Provider Provisioned Virtual Private Networks: <draft-ietf-ppvpn-requirements-02.txt>," Internet Draft, Aug. 2001, pp. 1-51, vol. ppvpn, No. 2, Internet Engineering Task Force, CH.

Supplemental European Search Report, dated Sep. 30, 2009 for EP20763778.

* cited by examiner

PHONE_BOOK

| Field Name | Type | Width | Index | Description | Source of Information |
|---|---|---|---|---|---|
| COUNTRY_CODE | Number | 5 | INDEX | Country Code.–Mandatory | Data Management |
| STATE_CODE | Number | 4 | INDEX | State Code.–Mandatory | Data Management |
| CITY_NAME | Character | 35 | INDEX | Name of the City.–Mandatory | Data Management |
| AREA_CODE | Number | 6 | INDEX | Area Code.–Mandatory | Data Management |
| NXX_CODE | Number | 3 | INDEX | Exchange Code.–Mandatory | Data Management |
| PHONE_NUMBER | Number | 10 | INDEX | Phone Number.–Mandatory | Data Management |
| MODEM_SPEED | Number | 5 | | Modem Speed.–Optional | Data Management |
| CLIENT_DEF_FLD1 | Character | 15 | | Client defined flied1 data–Optional | Data Management |
| CLIENT_DEF_FLD2 | | 15 | | Client defined flied2 data–Optional | Data Management |
| CLIENT_DEF_FLD3 | | 15 | | Client defined flied3 data–Optional | Data Management |
| CLIENT_DEF_FLD4 | | 15 | | Client defined flied4 data–Optional | Data Management |
| CLIENT_DEF_FLD5 | | 15 | | Client defined flied5 data–Optional | Data Management |
| ISP_CODE | Number | 6 | | Service Provider code from Service Provider Profile.–Mandatory | Service Provider Profile |
| PORT_NUMBER | Number | 5 | | Port Number–Optional | Data Management |
| MODEM_SUPPORT | Character | 10 | | Modem Support–Optional | Data Management |
| DUN | Character | 15 | | Dial-UP Networking settings used by the phone number.–Optional | Data Management |
| RATING | Number | 2 | | Priority of the phone number.–Optional | Data Management |
| SERVICE_TYPE | Character | 15 | | Service type provided by the service provider for the phone number.–Optional | ISP |
| DNS_SETTING | Character | 50 | | Domain Name Server Setting.–Optional | Data Management |
| DNS1 | Character | 25 | | Primary Domain Name Server.–Optional | Data Management |
| DNS2 | Character | 25 | | Secondary Domain Name Server.–Optional | Data Management |
| CHAP_SUPPORT | Character | 20 | | CHAP support–Optional | Data Management |
| ACTIVE_INACTIVE | Boolean | 1 | | Indicator whether the phone number is active or inactive.– Mandatory | Data Management |
| SCRIPT_NAME | Character | 15 | | Path of the .scp file.–Optional | Data Management |
| TERMINAL_PROMPT | Character | 10 | | Future Use.–Optional | |
| POP_NAME | Character | 25 | | Future Use.–Optional | |

*FIG. 15*

Table :COUNTRY_TABLE

| Field Name | Type | Width | Index | Description | Source of Information |
|---|---|---|---|---|---|
| COUNTRY_CODE | Number | 5 | INDEX | Country Code.–Mandatory | Data Management |
| COUNTRY_ABRV_NAME | Character | 2 | | Country Name.–Mandatory | Data Management |
| COUNTRY_LONG_NAME | Character | 40 | | Country Name.–Mandatory | Data Management |

*FIG. 16a*

Table :STATE_TABLE

| Field Name | Type | Width | Index | Description | Source of Information |
|---|---|---|---|---|---|
| COUNTRY_CODE | Number | 5 | INDEX | Country Code.–Mandatory | Data Management |
| STATE_CODE | Number | 4 | INDEX | State Code.–Mandatory | Data Management |
| STATE_ABRV_NAME | Character | 25 | INDEX | State Short Name.–Mandatory | Data Management |
| STATE_LONG_NAME | Character | 25 | | State Name.–Mandatory | Data Management |

*FIG. 16b*

Table :CITY_TABLE

| Field Name | Type | Width | Index | Description | Source of Information |
|---|---|---|---|---|---|
| COUNTRY_CODE | Number | 5 | INDEX | Country Code.–Mandatory | Data Management |
| STATE_CODE | Number | 4 | INDEX | State code.–Mandatory | Data Management |
| STATE_ABRV_NAME | Character | 25 | INDEX | State short Name.–Mandatory | Data Management |
| CITY_NAME | Character | 35 | | City Name.–Mandatory | Data Management |

*FIG. 16c*

Table    :SERVICE_PROVIDER_PROFILE

| Field Name | Type | Width | Index | Description | Source of Information |
|---|---|---|---|---|---|
| ISP_CODE | Number | 6 | | Service Provider Code.-Mandatory | ISP/Data Management |
| ISP_NAME | Character | 50 | | Name of the Service Provider.-Optional | ISP/Data Management |
| SUPPORT_PHONE_NUMBER | Number | 10 | | Support Phone Number.-Optional | ISP/Data Management |
| ISP_HOME_PAGE | Character | 100 | | ISP Home Page Address-Optional | ISP/Data Management |
| SMTP_SERVER | Character | 50 | | SMTP Server Name.-Optional | ISP/Data Management |
| POP_SERVER | Character | 50 | | POP Server Name.-Optional | ISP/Data Management |
| WEB_PROXY | Character | 50 | | Web Proxy-Optional | ISP/Data Management |
| SERVICE_TYPE | Character | 10 | | List of service types provided by the service provider separated by a comma or a space.-Optional | ISP/Data Management |
| PREFIX | Character | 25 | | Prepend given by the service provider.-Mandatory | ISP/Data Management |

*FIG. 17a*

Table    :USER_PROFILE

| Field Name | Type | Width | Index | Description | Source of Information |
|---|---|---|---|---|---|
| DIAL_AUTOMATICALLY | Boolean | 1 | | Indicates whether the user selected the Dial automatically check box in the Sign-In dialog box. | DIALER/USER |
| CITY_NAME | Character | 35 | | City typed or selected by the user. | DIALER/USER |
| COUNTRY_CODE | Number | 5 | | Country typed or selected by the user. | DIALER/USER |
| STATE_CODE | Number | 4 | | State typed or selected by the user. | DIALER/USER |
| AREA_CODE | Number | 6 | | Area Code typed or selected by the user. | DIALER/USER |
| PHONE_NUMBER | Number | 10 | | Phone Number typed or selected by the user. | DIALER/USER |
| DUN | Character | 15 | | Dial-Up Networking settings used by the primary phone number. | DIALER/USER |
| VERSION_NUMBER | Number | 5 | | Version number of the user profile. | DIALER/USER |

*FIG. 17b*

Table : USER_EXPERIENCE_FRONT_END

| Field Name | Type | Width | Index | Description | Source of Information |
|---|---|---|---|---|---|
| USER_NAME | Character | 25 | | User Name typed by the user. | DIALER |
| CLIENT_NAME | Character | 25 | | Client Name typed by the client. | DIALER |
| ACCESS_DATE | Date | 8 | | Date last accessed. | DIALER |
| NO_OF_ATTEMPTS | Number | 4 | | Number of attempts. | DIALER |
| SUCCESSFUL_COMPLETIONS | Number | 4 | | Number of Successful Completions. | DIALER |
| BUSY_ATTEMPTS | Number | 4 | | Number of Busy signals | DIALER |
| NO_OF_RING_NO_ACCESS | Number | 4 | | Number of Ring No Access. | DIALER |
| AUTHORIZATION_FAILURES | Number | 4 | | Number of Authorization Failures. | DIALER |
| NOT_AUTHORIZED_FAILURES | Number | 4 | | Number of Not Authorized Failures. | DIALER |
| PERCENT_AVAILABILITY | Number | 2 | | % Availability | DIALER |

FIG. 18a

Table : USER_EXPERIENCE_BACK_END

| Field Name | Type | Width | Index | Description | Source of Information |
|---|---|---|---|---|---|
| USER_NAME | Character | 25 | | User Name typed by the user. | DIALER |
| CLIENT_NAME | Character | 25 | | Client Name typed by the client. | DIALER |
| ACCESS_DATE | Date | 8 | | Date last accessed. | DIALER |
| ACCESS_TIME | Character | 8 | | Time last accessed. | DIALER |
| PREFIX | Character | 25 | | Prepend used for connection. | ISP/ADMIN/Data Management |
| CITY_NAME | Character | 35 | | City selected by the user. | DIALER/USER |
| COUNTRY_CODE | Number | 5 | | Country selected by the user. | DIALER/USER |
| STATE_CODE | Number | 4 | | State selected by the user. | DIALER/USER |
| AREA_CODE | Number | 6 | | Area Code selected by the user. | DIALER/USER |
| PHONE_NUMBER | Number | 10 | | Phone Number selected by the user. | DIALER/USER |
| ERROR_CODE | Number | 5 | | Error Number | DIALER |
| ERROR_DESC | Character | 50 | | Error Description | DIALER |

FIG. 18b

Table :CLIENT_PROFILE

| Field Name | Type | Width | Index | Description | Source of Information |
|---|---|---|---|---|---|
| CLIENT_ID | Number | 5 | INDEX | Unique ID for each client.-Mandatory | Data Management |
| CLIENT_NAME | Character | 25 | | Client Name typed by the client.-Mandatory | Data Management |
| VERSION_NUMBER | Number | 5 | | Version of the Client Profile.-Mandatory | Data Management |
| PASSWORD/PIN | Character | 25 | | Label Password or Pin.-Mandatory | Data Management |
| LOGO1 | Character | 13 | | Name of the client logo bitmap file.-Mandatory | Data Management |
| ICON | Character | 13 | | Name of the icon (.ico) file for the desktop icon displayed on the user's desktop.-Mandatory | Data Management |
| DOWNLOAD_DELAY | Number | 4 | | Time in seconds to wait before downloading Phone Book updates.-Optional | Data Management |
| LOG_SIZE | Number | 2 | | Size of the log file.-Optional | Data Management |
| USE_SAME_USER_ID | Number | 1 | | Use the settings for Username and Password for authentication when using a secure connection to connect.-Mandatory | Data Management |
| IDLE | Boolean | 1 | | Future Use. Indicates whether the client selected the disconnect option.-Optional | Data Management |
| IDLE_TIMEOUT | Number | 3 | | Future Use. Time in minutes the connection must be idle before disconnecting.-Optional | Data Management |
| IDLE_THRESHOLD | Number | 4 | | Future Use. Maximum bytes per minute that can be received if an idle state is detected for the connection.-Optional | Data Management |
| DOMAIN | Character | 50 | | Client radius domain or suffix-Mandatory | Data Management |
| DEFAULT_PREFIX | Character | 25 | | Default prepend given by the client.-Mandatory | Data Management |
| USE_DEFAULT_PREFIX | Boolean | 1 | | Indicator to check whether to use the default prepend-Mandatory | Data Management |
| NOPROMPT_RECONNECT | Boolean | 1 | | Controls whether the user should be prompted for reconnection.-Optional | Data Management |
| HELP_DESK_MESSAGE | Character | 50 | | Help desk message-Optional | Data Management |
| MESSAGE_PER_PANEL1 | Character | 50 | | Main Screen Message.-Optional | Data Management |

FIG. 19

| Field Name | Type | Width | Index | Description | Source of Information |
|---|---|---|---|---|---|
| LOGO_PER_PANEL1 | Character | 13 | | Name of the logo bitmap file displayed in the Main Screen.-Optional | Data Management |
| MESSAGE_PER_PANEL2 | Character | 50 | | User Experience Screen Message.-Optional | Data Management |
| LOGO_PER_PANEL2 | Character | 13 | | Name of the logo bitmap file displayed in the User Experience Screen.-Optional | Data Management |
| MESSAGE_PER_PANEL3 | Character | 50 | | Phone Book Screen Message.-Optional | Data Management |
| LOGO_PER_PANEL3 | Character | 13 | | Name of the logo bitmap file displayed in the Phone Book Screen.-Optional | Data Management |
| MESSAGE_PER_PANEL4 | Character | 50 | | Logs Screen Message.-Optional | Data Management |
| LOGO_PER_PANEL4 | Character | 13 | | Name of the logo bitmap file displayed in the Logs Screen.-Optional | Data Management |
| MESSAGE_PER_PANEL5 | Character | 50 | | Future Use.-Optional | Data Management |
| LOGO_PER_PANEL5 | Character | 13 | | Future Use.-Optional | Data Management |
| PRE_CONNECT_PROCESS1 | Character | 100 | | Syntax & Execution string Tested prior to table entry.<br><br>Process Execution String format:<br>PP/DP Process_Name [options] #U #P<br>PP —Parent Process<br>DP —Daughter Process<br>#U -Prompt UID<br>#P -Prompt PWD<br>#u -use local UID<br>#p - use local PWD<br>#MU-use Main UID<br>#MP-use Main PWD | Data Management |

*FIG. 20a*

| PRE_CONNECT_MESSAGE1 | Character | 100 | Message for obtaining the attributes for Pre Connect process1. | Data Management |
|---|---|---|---|---|
| PRE_CONNECT_PROCESS2 | Character | 100 | Syntax & Execution string Tested prior to table entry.<br>-Optional<br><br>Process Execution String format:<br>PP/DP Process_Name [options] #U #P<br>PP —Parent Process<br>DP —Daughter Process<br>#U —Prompt UID<br>#P —Prompt PWD<br>#u —use local UID | Data Management |
| | | | #p — use local PWD<br>#MU—use Main UID<br>#MP—use Main PWD | |
| PRE_CONNECT_MESSAGE2 | Character | 100 | Message for obtaining the attributes for Pre Connect process2.-Optional | Data Management |

*FIG. 20b*

| Field Name | Type | Width | Index | Description | Source of Information |
|---|---|---|---|---|---|
| POST_CONNECT_PROCESS1 | Character | 100 | | Syntax & Execution string Tested prior to table entry.<br>-Optional<br><br>Process Execution String format:<br>PP/DP Process_Name [options] #U #P<br>PP —Parent Process<br>DP —Daughter Process<br>#U —Prompt UID<br>#P —Prompt PWD<br>#u —use local UID<br>#p —use local PWD<br>#MU—use Main UID<br>#MP—use Main PWD | Data Management |
| POST_CONNECT_MESSAGE1 | Character | 100 | | Message for obtaining the attributes for Post Connect process1.-Optional | Data Management |
| POST_CONNECT_PROCESS2 | Character | 100 | | Syntax & Execution string Tested prior to table entry.<br>-Optional<br><br>Process Execution String format:<br>PP/DP Process_Name [options] #U #P<br>PP —Parent Process<br>DP —Daughter Process<br>#U —Prompt UID<br>#P —Prompt PWD<br>#u —use local UID<br>#p —use local PWD<br>#MU—use Main UID<br>#MP—use Main PWD | Data Management |

*FIG. 21a*

| | | | | |
|---|---|---|---|---|
| POST_CONNECT_MESSAGE2 | Character | 100 | Message for obtaining the attributes for Post Connect process2.-Optional | Data Management |
| POST_CONNECT_PROCESS3 | Character | 100 | Syntax & Execution string Tested prior to table entry. -Optional<br><br>Process Execution String format:<br>PP/DP Process_Name [options] #U #P<br>PP —Parent Process<br>DP —Daughter Process<br>#U -Prompt UID<br>#P -Prompt PWD<br>#u -use local UID<br>#p - use local PWD<br><br>#MU-use Main UID<br>#MP-use Main PWD | Data Management |
| POST_CONNECT_MESSAGE3 | Character | 100 | Message for obtaining the attributes for Post Connect process3.-Optional | Data Management |
| URL_ADDRESS1 | Character | 50 | http address for installation/update software-Optional | Data Management |
| URL_ADDRESS2 | Character | 50 | http address for installation/update software-Optional | Data Management |
| CLIENT_DEF_TAG1 | Character | 15 | Client defined tag1-Optional | Data Management |
| CLIENT_DEF_TAG2 | Character | 15 | Client defined tag2-Optional | Data Management |
| CLIENT_DEF_TAG3 | Character | 15 | Client defined tag3- Future Use- Optional | Data Management |
| CLIENT_DEF_TAG4 | Character | 15 | Client defined tag4- Future Use- Optional | Data Management |
| CLIENT_DEF_TAG5 | Character | 15 | Client defined tag5- Future Use- Optional | Data Management |

*FIG. 21b*

CLIENT-SIDE NETWORK ACCESS POLICIES AND MANAGEMENT APPLICATIONS

CROSS-REFERENCE TO RELATED APPLICATIONS

This application is a U.S. National Stage application of PCT/US2002/030936 filed on Sep. 30, 2002, and claims the benefit of the earlier filing date of U.S. Provisional Application No. 60/325,290, filed Sep. 28, 2001, entitled "Virtual Private Network, Apparatus, Method, and Computer Product" and U.S. Provisional Application No. 60/364,579 filed Mar. 18, 2002, entitled "Integrated Intrusion Detection System" the entirety of which are incorporated herein by reference.

BACKGROUND OF THE INVENTION

The present invention relates to telecommunication networks, and, more particularly, to a remote access client, associated network system, and related methodology for providing enterprise management of client-side applications and enterprise network access policies to ensure policy compliant access of enterprise resources.

Enterprise networks (i.e., private computer data networks) are generally designed to provide network access to designated individuals of an organization, such as employees of a commercial entity, for sharing computer-based resources. For example, a typical enterprise network may use high speed, dedicated lines that carry voice, facsimile, video and data traffic between facility locations of the entity. As such, the dedicated paths are point-to-point connections, thus, a mesh topology is formed to interconnect multiple facilities. Yet, in order for a remote office or individual user to connect to the enterprise network, switched services over the PSTN (public switched telephone network), such as ISDN (integrated services digital network) or frame relay are often utilized. For individual mobile employees, such a modem or "dial-up" connection may be the best solution for occasional connection to the enterprise network.

In accessing the enterprise network from a remote location not having a dedicated connection, a virtual private network (VPN) function is typically implemented. A virtual private network is a pseudo-private data network that utilizes a readily available public data network, such as the Internet, instead of dedicated lines to carry enterprise network traffic. An Internet-based virtual private network (VPN) link is thus "virtual" because although the Internet is freely accessible to the public, a VPN client application enables the Internet to function as a dedicated private network communication link. In order to accomplish this, the data traffic for the organization is exchanged by way of the VPN client protocol. The VPN protocol typically configures a "tunnel" connection by way of a protocol such as L2TP (layer two tunneling protocol) which serves to encapsulate and encrypt data exchanged between the enterprise and remotely located data terminal so that enterprise data is not easily intercepted by users of the Internet (i.e., from outside the tunnel).

Naturally, commercial organizations are increasingly employing VPN-based remote access solutions as, the availability of Internet access and robust VPN technology offers the ability to use public networks that make up the Internet as a flexible, cost-effective remote access solution. Thus, VPN implementations are favored by network architects to partially replace existing private data network infrastructure, supplement a private data network by helping relieve the load on the private data network, handle new software applications without disturbing the existing private data network or permit new user locations to be easily added to the network.

As Internet Service Providers (ISP) employ extensive networks to facilitate connectivity to the Internet over a broad geographical area, the most commonly utilized communication path for enterprise VPN technology is the Internet. Namely, a network access server (NAS) such as provided by an Internet Service Provider is contacted via a remote access client for connecting to a POP (point of presence) or "node" establishing enterprise network connectivity. In this way, an enterprise may negotiate an agreement with a single provider enabling its user base to connect to that network in order to supply the transport portion of the enterprise VPN. However, an enterprise VPN solution with only one network providing data transport services may be limited in coverage and diversity. For instance, should an individual POP or the network itself go down, the end user may have no way to connect to the enterprise. The ISP may also be slow to expand their network to provide coverage that is critical to a particular enterprise network having users in a poorly serviced region of the ISP. Thus, an enterprise network may try to overcome these limitations by adding redundant providers to the solution to complement a primary network partner. Unfortunately, this introduces significant complexity, because each network will require separate authentication, billing and customer service relationships.

Thus, as an alternative to single-carrier implementations, multiple ISPs are often packaged as roaming solutions (i.e., a "network of networks"). This is accomplished by forwarding authentication and billing information to enable a single customer to interface to many different transport providers. Yet, depending on the design of the network, companies that aggregate ISPs have had difficulty ensuring there is no single point of failure in the authentication chain that would bring the entire solution down. Also, the ability to cost effectively monitor and manage the various networks, account for individual usage, determine billing responsibilities, is hampered. Most importantly, these providers are typically unfamiliar with the security, information and management needs unique to the enterprise network market.

Indeed, remote access of enterprise resources through remote access client in conjunction with a VPN client presents significant security concerns to enterprise network architects, as enterprise policies cannot be readily coordinated prior to, or during connection (e.g., tunnel construction). In other words, while the data communicated across the VPN link is encapsulated and encrypted, the data terminal of the remote user may itself be vulnerable to intrusive use (i.e., hacking). For example, unless a user is employing adequate firewall protection, an intruder may gain access to the data terminal and effectively circumvent the security afforded by the VPN tunnel.

As such, a remote access client, associated system, and related methodology are desired which are devoid of the aforementioned limitations, capable of integrally processing dial-up connections across a plurality of service providers in a simplified manner, while simultaneously ensuring VPN based policy compliant access of enterprise resources.

SUMMARY OF THE INVENTION

An exemplary embodiment of the present invention provides a remote access client. The remote access client enables communication between a remote data terminal configured to access a public network, and an enterprise network by way of a VPN tunnel through the public network. The remote access client includes a connection agent for establishing connection to, in accordance with a selected carrier of the public network, a point of presence on the public network for transporting data between the remote data terminal and the enterprise network in accordance with a remote access client protocol. At least one application program interface (API) is employed by the remote access client to receive verification of the operating state of a predetermined application of the remote data terminal, the remote access client enabling the connection agent upon the verification to establish connection to the point of presence. The point of presence enables a VPN tunnel for transporting data from the remote data terminal to the enterprise network across the public network.

In another aspect of the invention, a remote access client is provided for enabling communication between a data terminal configured to access a public network, and an enterprise network by way of a VPN tunnel through the public network. The remote access client includes at least one application program interface (API), the remote access client employing the API for exchanging data with a predetermined application of the remote data terminal upon establishment of the point of presence. The API receives periodic verification of the operating state of the predetermined application. The connection agent terminates the connection to the point of presence upon the absence of the verification.

In still a further aspect of the invention, a virtual private network system is provided for accessing a public network, and an enterprise network by way of a VPN tunnel through the public network. The system enables a virtual private network connection between the private network and remote data terminal. The remote data terminal of the system includes a remote access client for transporting data over a VPN link in accordance with a VPN protocol of a remote access client. The remote access client has a connection agent for establishing, in accordance with a selected carrier of the public network, a connection to a point of presence on the public network for transporting data between the remote data terminal and the enterprise network. The remote access client also includes at least one application program interface (API) to receive verification of the operating state of a predetermined application of the remote data terminal. The remote access client enables the connection agent upon the verification to establish connection to the point of presence. The remote data terminal employs a policy profile for identifying the predetermined application, and a user experience log for storing connection parameters detailing a connection history of the remote data terminal. An enforce platform receives the contents of the user experience log from the remote data terminal upon connection.

In yet another aspect of the present invention, a method of accessing an enterprise network by way of a VPN tunnel through a public network is provided. The method includes providing an application suite to a remote user of the remote data terminal. The application suite includes a remote access client to configure a VPN link between the enterprise network and the remote data terminal, and at least one policy compliant application. A phone book is included in the suite for storing contact indicia for establishing connection to the public network. A policy profile is responsive to the suite for detailing the cooperative execution of the at least one policy compliant application relative to the remote access client.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIGS. 15-18 together present a physical data model corresponding to the logical data model of FIG. 14; and FIGS. 19-21B together present an exemplary client profile in accordance with an exemplary embodiment of the invention.

DETAILED DESCRIPTION OF THE INVENTION

Figure 1:
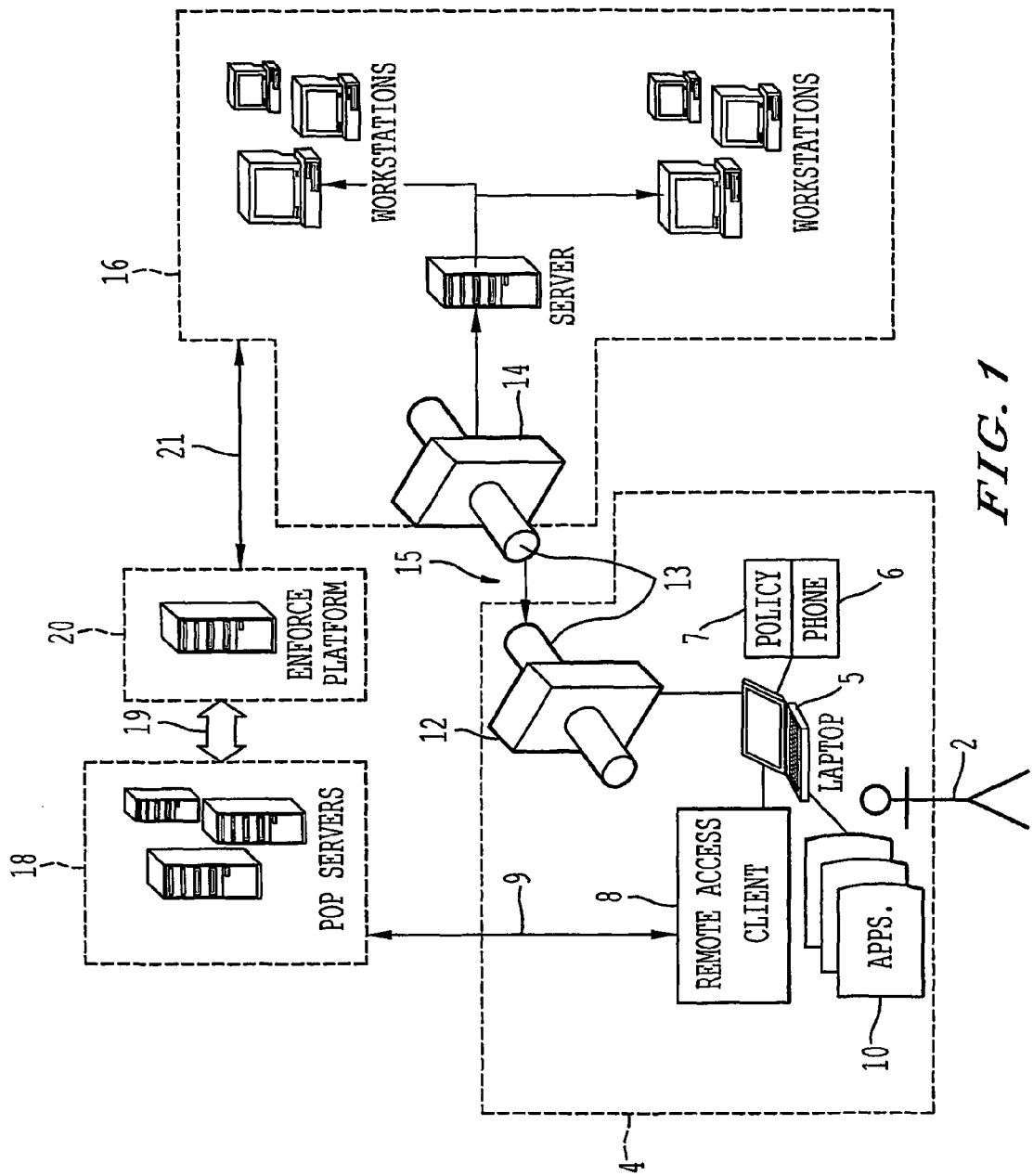
FIG. 1 is a high level network diagram of a remote access client system in accordance with an exemplary embodiment of the invention.

Certain terminology used in the following description is for convenience only and is not limiting. The term "click" as used herein refers to the usual manner of selecting and accessing textual and graphical based computer information. The term does not limit the present invention to mouse-based peripherals or like interface devices, but is simply utilized as a shorthand term for describing known computer functionality and processes. The term remote access client or "dialer" as used herein refers to an instruction set for establishing communication between appropriately configured devices. Such terminology is not limited to "dial-up" configurations only, but broadband and wireless implementations as well. In the drawings, the same reference numerals are used for designating the same elements throughout the several figures.

I. Remote Access Client Functionality Overview

The present invention, as disclosed in the foregoing exemplary embodiment provides a remote access client and associated method of integrally processing dialer connections across a plurality of service providers in a simplified manner, while simultaneously ensuring policy compliant access of enterprise resources via a VPN tunnel. Enterprise resources are made available by an enterprise network provided for distributing shared computer resources, typically, to members of a commercial organization. The enterprise network is accessed by a remote data terminal through a virtual private network (VPN) link configured by way of a public network such as the Internet. The VPN link is constructed in accordance with a remote access client of the remote data terminal as dictated by the remote access client.

The remote access client includes a dialer or "connecting agent" for establishing, in accordance with a selected carrier of the public network, a connection to a POP on the public network for transporting data between the remote data terminal and the enterprise network over the VPN link. The POP is provided by an access provider, upon confirmation of authentication data passed from the remote data terminal thereto, and confirmed by way of an authentication server of the enterprise network, identified by an enforce platform. An application program interface (API) of the remote access client is employed for exchanging data with one or more predetermined applications of the remote data terminal. The remote access client cooperatively operates with applications of the remote data terminal and in accordance with sub-components of the remote access client. The sub-components include a client policy file and phonebook file resident in a memory of the remote data terminal for appropriately configuring the remote access client as described hereinafter.

Referring now to FIG. 1, a network diagram is shown for describing the high level functionality of network components and remote access client 8 in accordance with an exemplary embodiment of the invention. In the high level diagram of FIG. 1, the description of individual server functionality and network components such as routers are omitted for sake of simplicity, the description of such is provided in greater detail with reference to FIG. 2. The network diagram components include a remote data terminal, generally designated 4, embodied by a personal computer (PC) 5 having client-side software applications, including a remote access client generally designated 10, phonebook and policy files 6 and 7 respectively, firewall 12, and a remote access client 8. In the exemplary embodiment the policy file 6 and phonebook file 7 are sub-components of remote access client 8, shown here separately for illustrating individual functionality. The remote data terminal 4 is employed by a remote user 2. The remote data terminal 4 is configured to access a public network 9, such as the Internet for connecting to a POP. The POP is a network node of an access provider, generally designated 18. In the exemplary embodiment, the access provider 18 may be one of a plurality of Internet Service Providers (ISP) referred to herein as "roaming POPs".

The remote access client 8 of remote data terminal 4 is launched (i.e., initially executed by the remote user 2) to initialize a VPN link with the enterprise network 16 over a public network 9. The discussion of routine HTTP protocol handshaking and DNS query processing is omitted here for sake of brevity. In the exemplary embodiment, the remote access client 8 contacts a POP of access provider 18 in accordance with contact indicia stored in a phonebook file 6 of the remote data terminal. At the outset, the remote access client 8 exchanges authentication data (i.e., user id, password) in accordance with an authentication protocol with the access provider 18 for identifying the remote user 2. The access provider 18 communicates with an authentication server of the enterprise network 16 as identified by a enforce platform, generally designated 20. The enforce platform 20 functions as an intermediary between the access provider 18 and the enterprise network 16, and serves as a centralized location for managing account information including usage, billing and traffic logs in response to processed traffic of a remote user 2. The enforce platform 20 may be operably linked to the enterprise network 16 through a secure connection 21, for configuring the enforce platform 20 to identify the remote user 2. A security protocol or "shared secret" may be used for communications between the enterprise network 16 and enforce platform 20 and is predetermined by the enterprise network 16 and the enforce platform 20 and arranged as part of the provider agreement for providing network services to the enterprise network 16, designated by arrow 19.

Upon verification by the enterprise network 16 of the authentication data provided by the remote user 2 to access provider 18, the access provider 18 communicates the availability of the POP connection. The POP can then enable, as shown separately in FIG. 1 for simplicity as a virtual circuit, a VPN tunnel 13 from a firewall 12 of the remote data terminal 4 to the firewall 14 of enterprise network 16 in accordance with the execution of the remote access client 8 employing a remote access client of the remote data terminal such as Microsoft® LZTP/IPSec VPN client. The remote access client of the exemplary embodiment employs a VPN encapsulation and encryption protocol such as EPSec or L2TP. However, prior to the acceptance of the connection to the POP, the remote access client 8 performs pre-processes in accordance with a client profile or "policy" 7. The pre-processes can be configured via an application program interface (API) leveraged by the remote access client 8 to launch one or more applications 10 of the remote data terminal 4 such as a firewall application for protecting the remote data terminal 4 during connection to the enterprise network 16 via the POP. Alternatively, the remote access client 8 may include a proprietary API for interfacing with one or more applications. Additionally, the remote access client 8 may employ post-processes after connection to the POP to monitor the operability of the applications 10 through a background process or daemon for disconnecting the remote data terminal from the POP in the event that an application performs a disallowed function defined in the policy 7, such as turning off firewall 12 or configuring it in a manner disallowed by the policy 7.

The enforce platform 20 provides updates to the remote data terminal 4 for "pushing" or dynamically updating files stored thereon such as the phonebook and policy files 6 and 7. In this way, the policy file 7 and phonebook file 6 may be updated to include new policy settings or new POP indicia respectively during each connection to the enterprise network 16 via the POP. The exemplary remote access client 8 in this way provides an interface to a Roaming Point of Presence (RPOP), which is an installation of the above described components of remote access client 8, and any associated applications 10 such as a remote access client packaged and located with connectivity to carriers, enterprise network 16 and the Internet.

Referring now more specifically to the components of the exemplary embodiment of FIG. 1, the remote data terminal 4 is described and depicted herein as including a laptop computer 5 for sake of simplicity, the laptop having an appropriately configured interface for accessing the publicly available network 9 such as the Internet. However, those skilled in the art will recognize that the function of the remote data terminal 4 may be embodied by any number of electronic devices suitable interface software, such as a dummy terminal, personal digital assistant (PDA), or cellular telephone. Of course such devices are submitted as illustrative examples only, and not an exhaustive list. In such embodiments, applications such as data synchronization, unified messaging and software updating may be employed as part of the remote access client system platform to make the remote access experience more seamless and robust.

Similarly, while the remote data terminal 4 is described herein as employing a TCP/IP protocol stack for effecting communication between network nodes, those skilled in the art will recognize that alternative networking technologies are likewise embraced by the teachings of the present invention. Moreover, the network technologies described herein, while described and depicted as hard wire implementations are equally applicable to wireless implementations such as Bluetooth® and I.E.E.E. 802.11x wireless Ethernet.

The remote data terminal 4 of the exemplary embodiment, is a laptop PC 5 such as a Pentium™ class computer configured with Microsoft® Remote Access Support Application Protocol Interface (RASAPI), and applications 10 required by the enterprise network 16 and designated in a policy file 7 provided to the remote data terminal 4, typically upon installation of the remote access client 8 (i.e., application suite). A suitable operating system functions to cooperate with the applications 10 and remote access client 8 to effect their execution on the remote data terminal 4. In the exemplary embodiment a graphical user interface (GUI) based operating system is described, however alternative operating systems may include but are not limited to Unix, Solaris, Linux, Windows 95, 98, 2000 and NT 4.0, as well as Apple MAC-OS. The remote data terminal also includes a modem device, (NIC), or network adapter (not shown) for connecting to the public network 9. Of course, a dedicated remote data terminal 4 having a specific instruction set for communication only and having none of the above software features may be provided where necessary for reducing the cost of the remote data terminal, the exemplary configuration is merely described for illustrating the breadth of the inventive features. The description of standard PC features, such as local volatile and/or non-volatile memory, I/O capabilities, common peripheral devices, as well as hardware component functionality have been omitted for brevity, the detailed operation/description of which is well known to those skilled in the art.

II. System Architecture

Figure 2A:
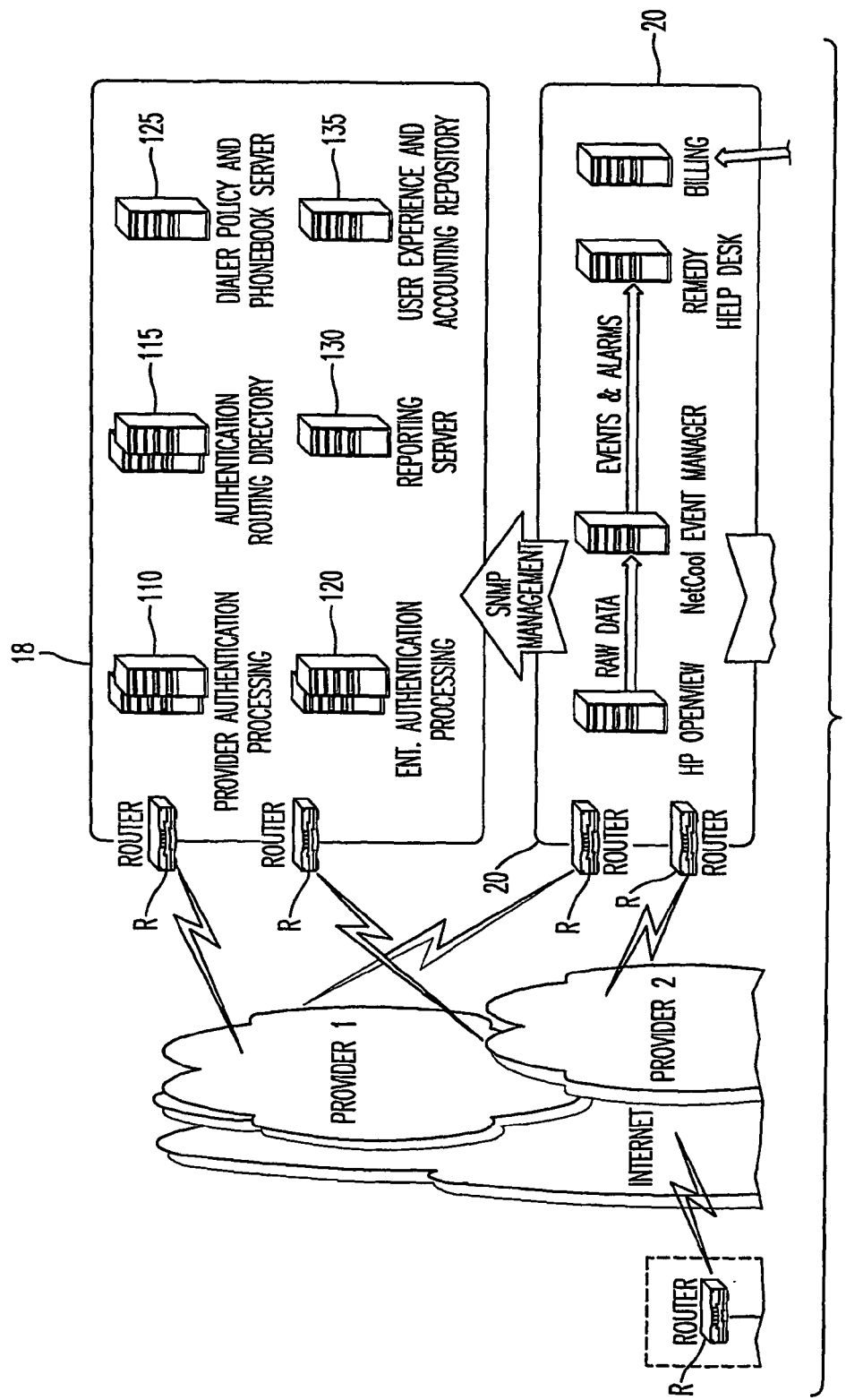
FIG. 2 is a network diagram illustrating an implementation of the remote access client system in accordance with FIG. 1.
Figure 2B:
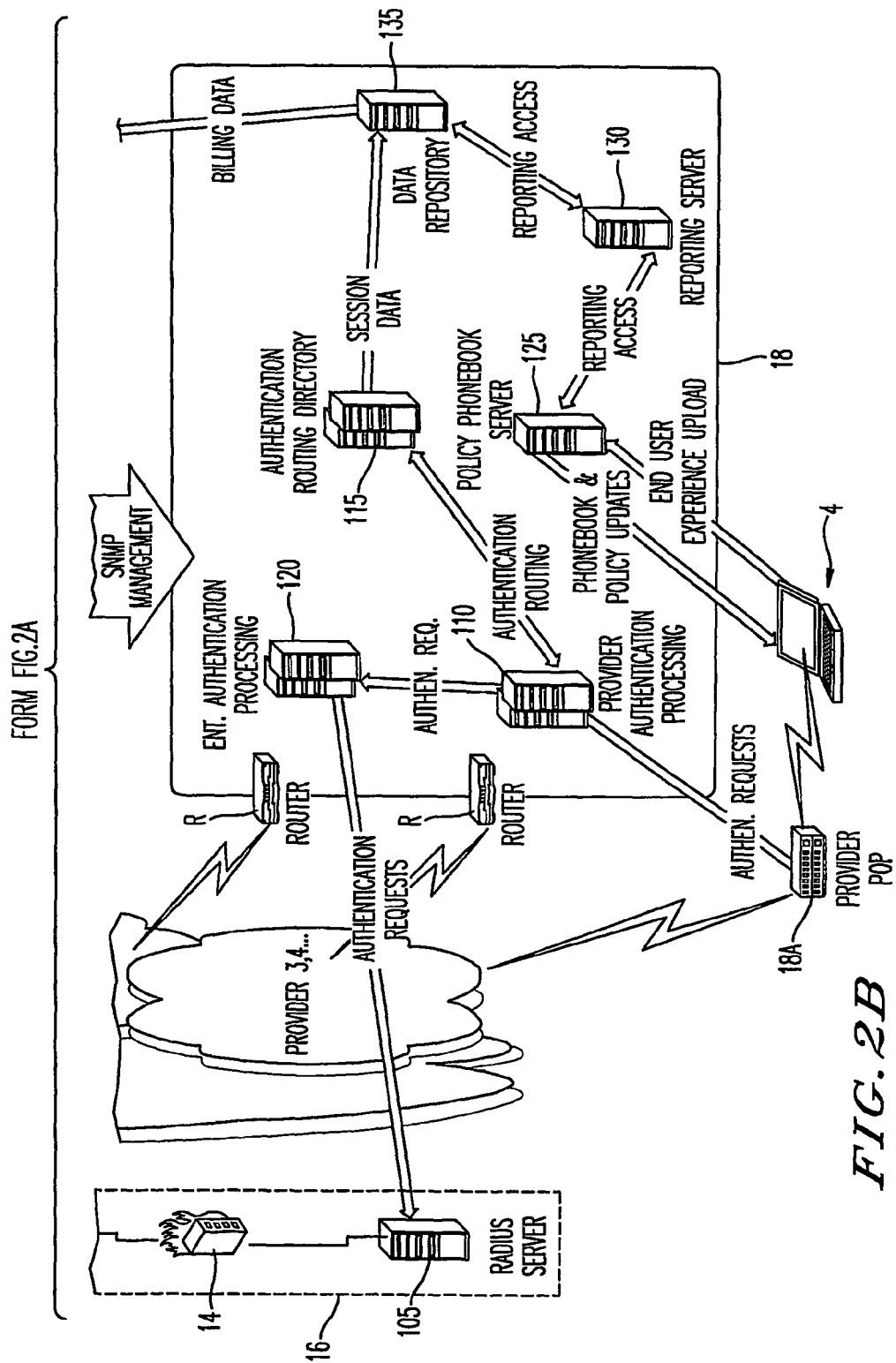

Referring now to FIG. 2, a high level network diagram is shown illustrating an implementation of the remote access client based system for employing a VPN link in accordance with an exemplary embodiment of the invention to integrally process dial-up connections across a plurality of access providers 18, while simultaneously ensuring compliant access of resources of an enterprise network 16 in accordance with a policy 7 of a remote access client 8.

The configuration of access provider network 18 of the top most rectangle of FIG. 2 and the bottommost rectangle are functionally identical. As the RPOP structure of the remote access client system of the exemplary embodiment employs a plurality of functionally identical, integrated RPOPS, the RPOP functionality is discussed with reference to the bottommost rectangle only. In the exemplary system, access providers 18 or "carriers" as well as a plurality of enterprise networks can be added to the modular remote access client system platform. Once added, "enterprise customers" of the system (i.e., organizations) get immediate benefit from the diverse architecture as access providers 18 do not have to change current authentication and accounting infrastructure to provide interoperability with the system of the exemplary embodiment. Enterprise customers can use existing authentication repositories using any number of products that facilitate remote authentication dial-in user service (RADIUS) proxy. End-to-end testing of the authentication and accounting for new carriers and enterprise customers is performed entirely from within the infrastructure, using tools available to the enforce platform 20 as discussed below with reference to FIGS. 8-9.

All potential access providers 18 are certified by personnel of the enforce platform 20 before integration with the remote access client system. In order to meet certification, an access provider network 18 of the exemplary embodiment is capable of delivery across a set of network requirements. For example, pure IP transport is enabled with support for all IP protocols including TCP, UDP, ICMP, IPSec, GRE, etc., authentication support based on current RADIUS RFC standards, real-time accounting based on current RFC standards, RADIUS forwarding by realm name prefix or suffix, support for dynamic RADIUS server failover, and phonebook and connection agent diagnostic.

Upon certification, a provisioning process is initiated. The provisioning process involves the access provider 18 seeding the appropriate prefix and/or suffix in their network, and RADIUS Server configuration of failover attributes, shared secrets and RADIUS attributes. After quality assurance is complete, the phonebook of access provider 18 will be loaded into the appropriate customer profiles for subsequent download to the remote access client 8 at the next connection (as described herein). This rigorous testing procedure, along with automatic updating capabilities, ensures seamless upgrades to end user experiences as the enforce platform 20 incorporates new access provider networks 18. Should it be required that an access provider 18 be removed from the solution, the phonebook would be removed and, after a reasonable time frame to allow for phonebook updates to propagate.

In the exemplary remote access client system configuration, the enterprise customer would be required to allow access to their RADIUS servers 105 from all of the access provider authentication processing servers 120. In this way the shared secret for the RADIUS conversations would be agreed upon and configured for the enterprise authentication processing servers 120 by the enforce platform 20 upon incorporation of the particular access provider 18 into the remote access client system platform. After quality assurance is complete, a custom remote access client 8 would be distributed within the enterprise organization via hard-copy storage mediums such as CD-ROM, floppy disk, DAT, DVD-Rom and the like, or by electronic communication such as email, or posting to a password protected portion of a web site of the enterprise or the enforce platform 20.

Referring now once again to FIG. 2, the functionality of the access provider 18 of the bottom rectangle is more specifically described. Access provider POP functionality is illustrated by 18A of access provider 18. The provider authentication processing server 110 of access provider 18 serves as the destination for authentication requests being generated in the remote access client 8 of the remote data terminal 4 via provider POP 18A. An authentication routing directory server 115 is queried by the provider authentication processing server 110 to determine the appropriate path to the enterprise authentication processing server 120. The authentication routing directory server 115 also collects all accounting and session information from all authentication servers of access providers 18 in the roaming network and replicates this information with other authentication routing directory servers 115. An enterprise authentication processing server 120 receives the authentication requests of the provider authentication processing server 110, and in turn, forwards the request to the appropriate enterprise RADIUS server 105. A policy/phonebook server 125 stores and serves phone books and profile updates for the phone and policy files 6 and 7 respectively of remote access client 8. Many unique dialer profiles and phonebooks can be supported concurrently for remote access clients 8 corresponding to a plurality of enterprise networks 16. Policy/phonebook server 125 is also the server that receives uploaded end user experience data generated by the remote access client 8 as described herein.

On each connection attempt by the remote access client 8, an end user experience log file detailing the progress of the request is created. On a successful connection, the remote access client 8 will upload the end user experience data to the policy/phonebook server 125. This data can subsequently be used to troubleshoot problems, provide data to performance reporting, and feed into the enforce platform 20. In addition, in the event that a remote user 2 cannot connect and call enterprise network personnel for help, the end user experience data can be viewed directly from the remote access client 8 in order for the end user to more effectively communicate the current issue to be resolved. This tool enables the remote user 2 to communicate with help desk personnel exactly what is occurring during their connection attempts. In an alternative embodiment utilizing a broadband connection for example, end user experience data may be uploaded periodically in batch form or upon every new session connection.

A reporting server 130 enables customer access to the reporting functionality. Reports can be generated from the user experience data and session accounting data stored therein. A data repository 135 houses the databases containing pre-processed end user experience data and session accounting data. Routers "R" are identified throughout the network diagram of FIG. 2 to illustrate routing data from location to location in accordance with the exemplary embodiment. Those skilled in the art will recognize that the functions described in reference to the servers above, are not necessarily independent and can be combined in one or more servers as desired.

The software and hardware of the remote access client system are redundantly designed. For example, multiple redundant authentication routing directory servers 115 keep track of all customer and provider authentication processing servers in the environment. Thus, servers can be added or taken out of service without interruption of the authentication processes. Session accounting information is replicated to all the authentication routing directory servers 115 and to the data repository server 135 in each RPOP. Multiple Policy/Phonebook servers 125 are always available to the remote access client 8 for policy downloads and end user experience data uploads. Connectivity into each RPOP is provisioned from multiple providers across diverse facilities. No single point of failure exists with respect to equipment, connectivity or software components.

The middle rectangle of FIG. 2, depicts the components of the enforce platform 20. Enforce platform 20 is a network operation center for supporting all entities incorporated in the remote access client system platform. Customer service tickets (i.e., queries) can be submitted via e-mail or the remote user 2 calling a designated customer service center. The enforce platform 20 is positioned, because it is directly in the path of authentication and accounting data, to dictate other policy attributes as they become available. Examples of this include the ability to use Quality of Service (QOS) capabilities and policy-based networking as these features become available. In the exemplary embodiment phonebook formatting based on performance of access providers 18 is accomplished manually. Using end user experience data, an alternative embodiment of remote access client 8 may dynamically format the enterprise phonebook to prefer access providers and providers that outperform others in terms of connectivity and trouble free use. These changes can applied in real time to further enhance reliability of the platform.

In the exemplary embodiment, monitoring and management tools are employed by enforce platform 20 to ensure the system is performing as designed. HP OpenView® is employed for identifying connectivity issues, performance issues, CPU and disk utilization, up/down status (i.e., operability) and identifying faults in the network system. A network node manager and an industry-standard simple network management protocol (SNMP)-based management environment is employed, and Micromuse NetCool® a carrier-class event management platform for parsing management information and intelligently generating alerts and alarms for the enforce platform 20. For example, the Netcool event manager may monitor the output from HP OpenView®, end user experience data, a variety of log files and process output for alarm and alert of authentication issues, service failures and other anomalies. Proactive monitoring of all end user experience data is used to determine potential provider and/or POP problems. The aggregate of all the end user experience data is used for this function in real time. Thresholds are set with respect to access providers 18 as to when alarms and alerts will be triggered.

In the exemplary embodiment, the phonebook 6 may be dynamically updated each time a remote access client 8 of a remote data terminal 4 connects to a POP, but, as required and on a per-profile basis, specific aspects of the profile 7 can be changed, and updated executables pushed. To this end, updates are sent from the policy and phonebook server 125 upon connect, and are stored until the remote access client 8 is closed by the remote user 2. Facilities for reverting to the non-updated phonebook and/or policy version are also available. Thus, policy attributes such as pre- or post-processes and other policy attributes are pushed from the policy/phonebook server 125 and can therefore be controlled and changed centrally, limiting the possibility that a remote user 2 will inadvertently corrupt the policy file 7 or "profile". This ensures the administrator of the enterprise network 16 has complete control over the security and administration policies of the remote user 2.

A. Connection Agent Configuration

Figure 3:
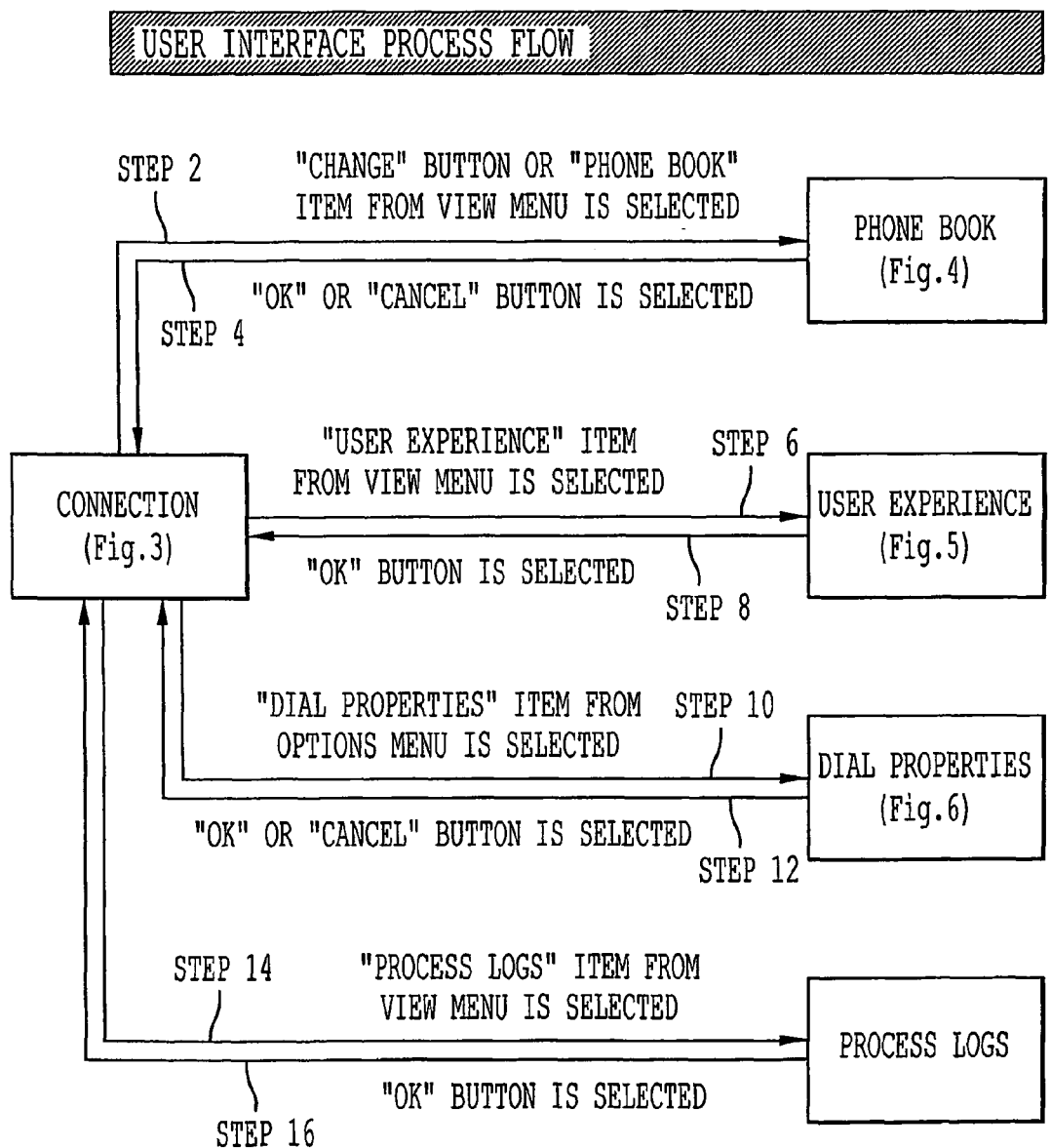
FIG. 3 is a flow chart depicting the configuration of the connection agent in accordance with an exemplary embodiment of the present invention.

Referring now to FIG. 3, a flow chart is shown for illustrating the process by which the remote access client 8 is cooperatively functions together with a VPN client of the remote data terminal 4 in accordance with an exemplary embodiment of the present invention, referring to the exemplary GUI displays of FIGS. 4-7. Menus and features of the GUI displays described herein are actuated by clicking the appropriate menu, button, or designated GUI region.

Figure 4:
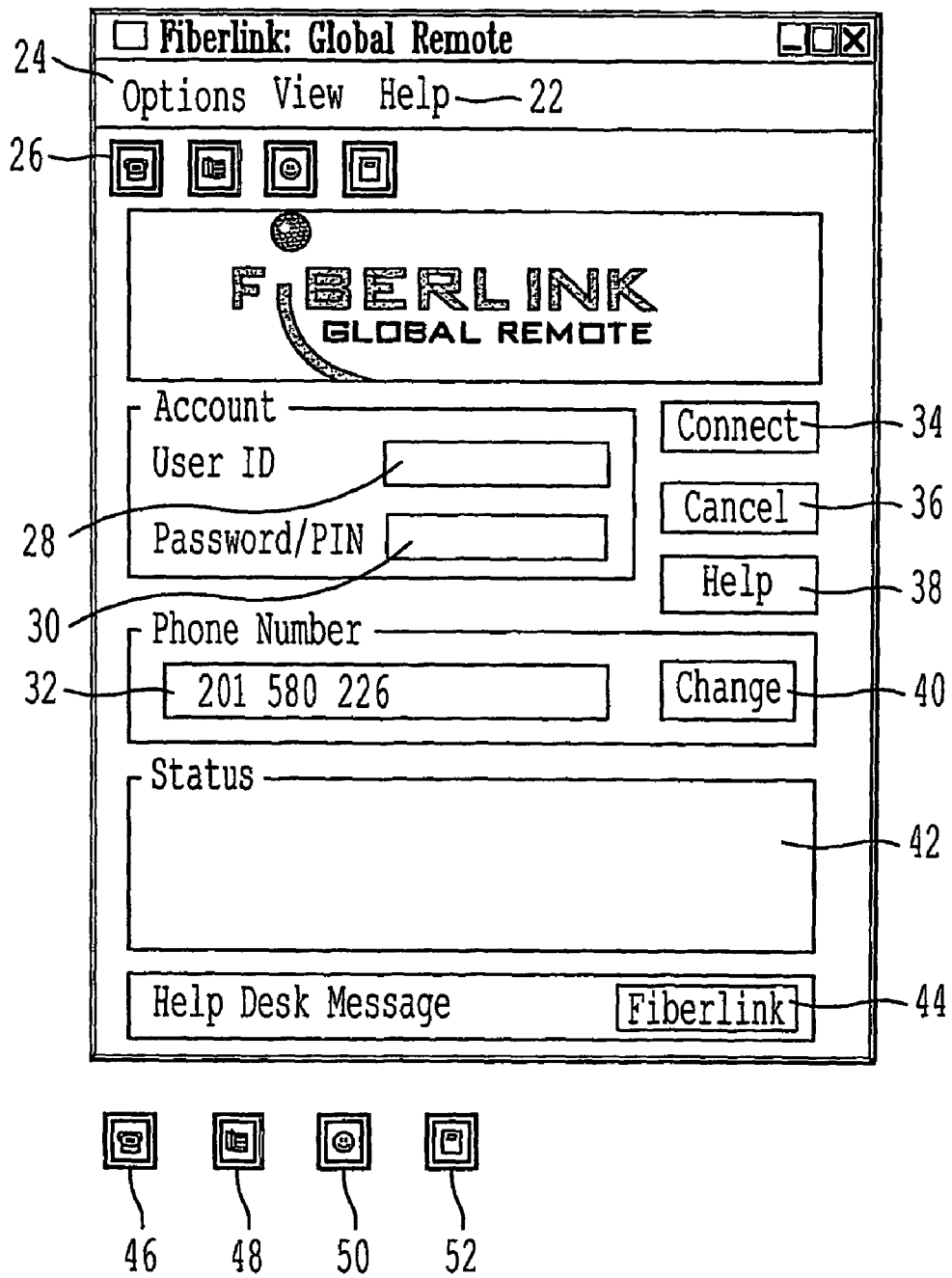
FIG. 4 is an exemplary connection GUI display in accordance with an exemplary embodiment of the invention.

At launch, a connection GUI as shown in FIG. 4 is presented to the remote user 2 via a display of REMOTE data terminal 4. The connection GUI includes data fields 28 for receiving a user ID, field 30 for receiving a password, and field 32 for receiving an access provider's POP contact indicia (i.e., POP 18A). A status window 42 is provided for alerting the remote user 2 to the status of the connection to the POP 18A. The remote user 2 may access menu 24 or toolbar 26 to alter a configuration of the remote access client 8, a help menu is provided at 22. A connect button is provided for employing the data field values provided in the data fields 28, 30 and 32. The change button 40 presents the GUI display of FIG. 5 to the user for changing POP contact indicia. Buttons 36 and 38 are provided for canceling the launch and accessing help respectively. A vendor area 44 is provided for branding the remote access client 8.

Figure 5:
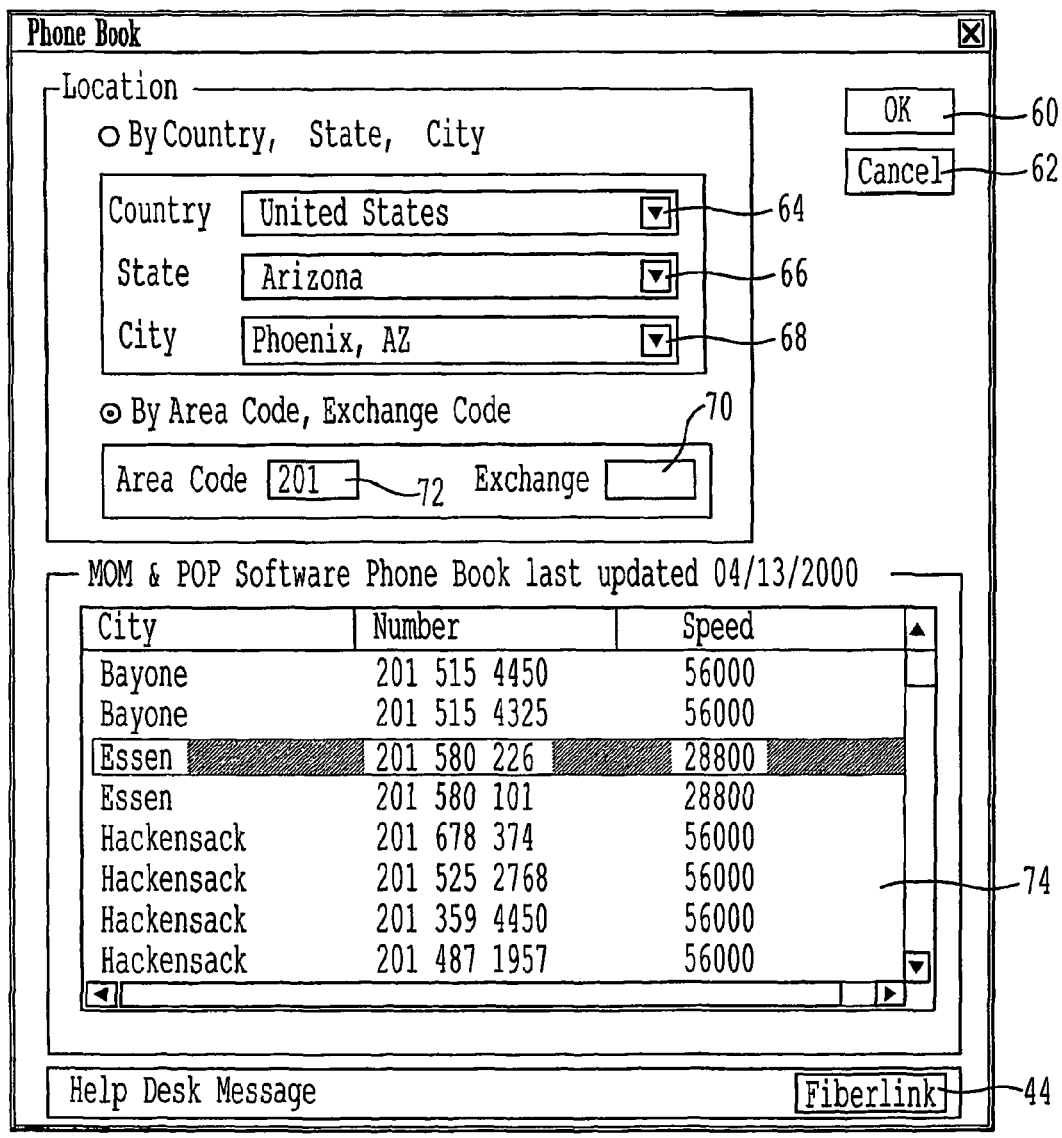
FIG. 5 is an exemplary phone book selection GUI display in accordance with an exemplary embodiment of the invention.

At step 2 a phone book button is clicked for providing the GUI display of FIG. 5 to the remote user 2. The GUI of FIG. 5 enables selection of POP contact indicia for use by the connection agent. Data fields 64-74 are provided for altering one or more components of the POP contact indicia such as country, city, state and phone number and enables the selection of a single POP provider 18A among a plurality of available access providers of RPOP network 18. Buttons 62 and 64 are provided for returning to the connection GUI at step 4. In an alternative embodiment, remote access client 8 employs software agent for helping the remote user 2 to locate a POP 18A within the local calling area, cycle through a list of potential POP telephone numbers, and recommend numbers, based on potential cost and reliability.

Figure 6:
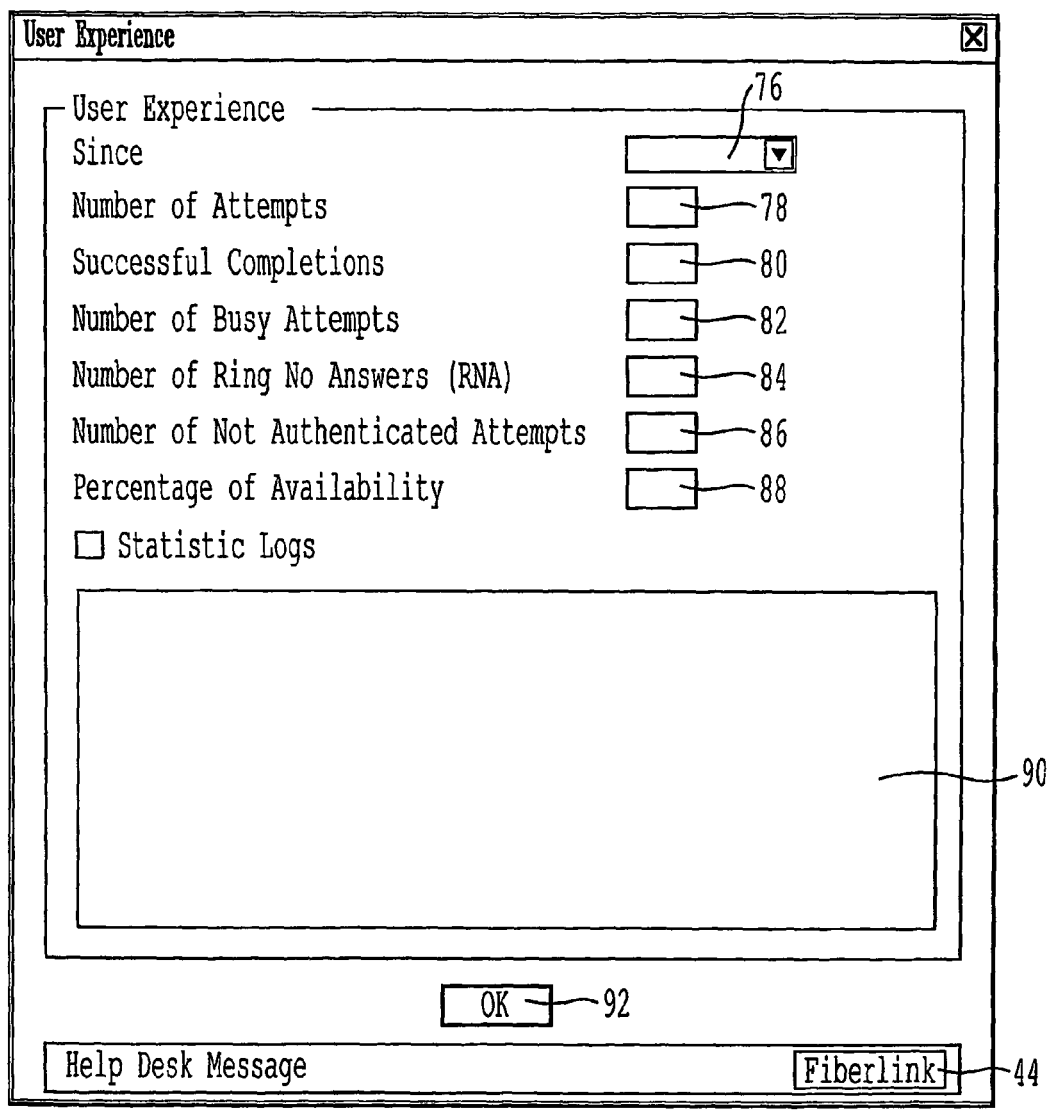
FIG. 6 is an exemplary user experience GUI display in accordance with an exemplary embodiment of the invention.

At step 6 a user experience button is clicked for providing the GUI display of FIG. 6 to the remote user 2. The GUI display of FIG. 6 provides a summary of experience data in relation to the connection agent for a specific POP 18A, such that upon examination by the remote user 2, the remote user can select a POP 18A of the plurality of POPs 18A listed in the GUI display of FIG. 5 in accordance with the experience data. To this end, data fields 78-86 contain parameters associated with contacting the designated POP 18A, such as the number of contact attempts, number of successful completions, number of busy attempts, number of ring no answers (RNA), number of not authenticated attempts, and an overall percentage availability value. The data field 76 can be provided by the remote user 2 to change the duration of the sample of data and window 90 provides a listing of logs for dial-up process. The connection screen of the GUI display of FIG. 4 is returned in step 8 by clicking button 92.

Figure 7:
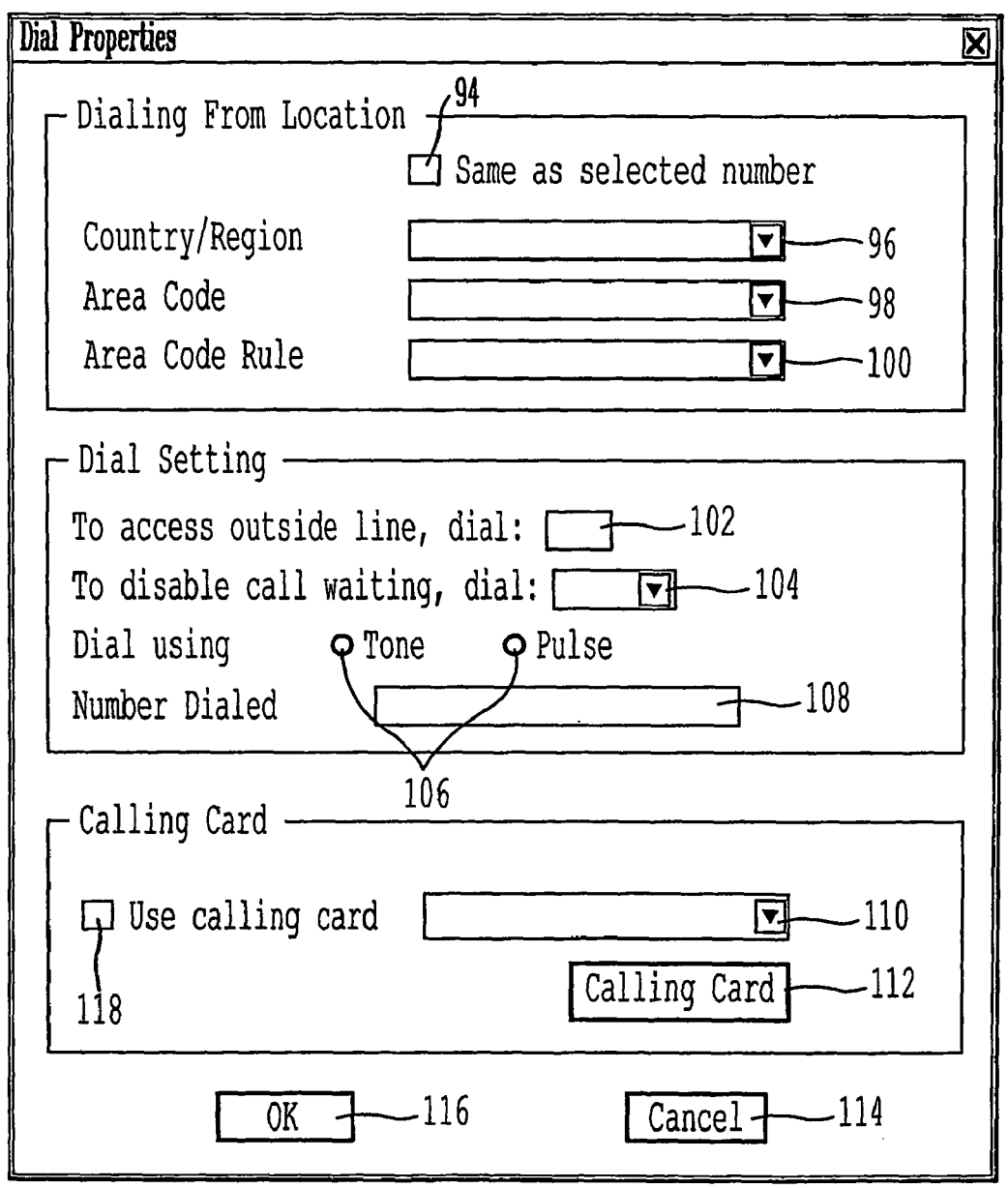
FIG. 7 is an exemplary dial properties GUI display in accordance with an exemplary embodiment of the invention.

At step 10 a dial properties button 46 is clicked for providing the GUI display of FIG. 7 to the remote user 2. The GUI display of FIG. 7 provides the dial properties utilized by the connection agent. Data fields 94-106 and 110-112 allow the user to alter such properties as country/region called from, are code called from, any area code rule selection, number to access an outside line and/or disable call waiting, selecting between touch-tone or pulse dialing, international call prefixes or calling card data. Data field 108 lists the number dialed. The connection GUI display of FIG. 4 is returned in step 12 by clicking button 116 to accept changes, or button 114 to cancel changes.

At step 14, a process log button 52 is clicked for providing a process log GUI display (not shown). Upon examination of the process log, the user can return to the connection GUI display of FIG. 4 in step 16.

B. Authentication

Figure 8:
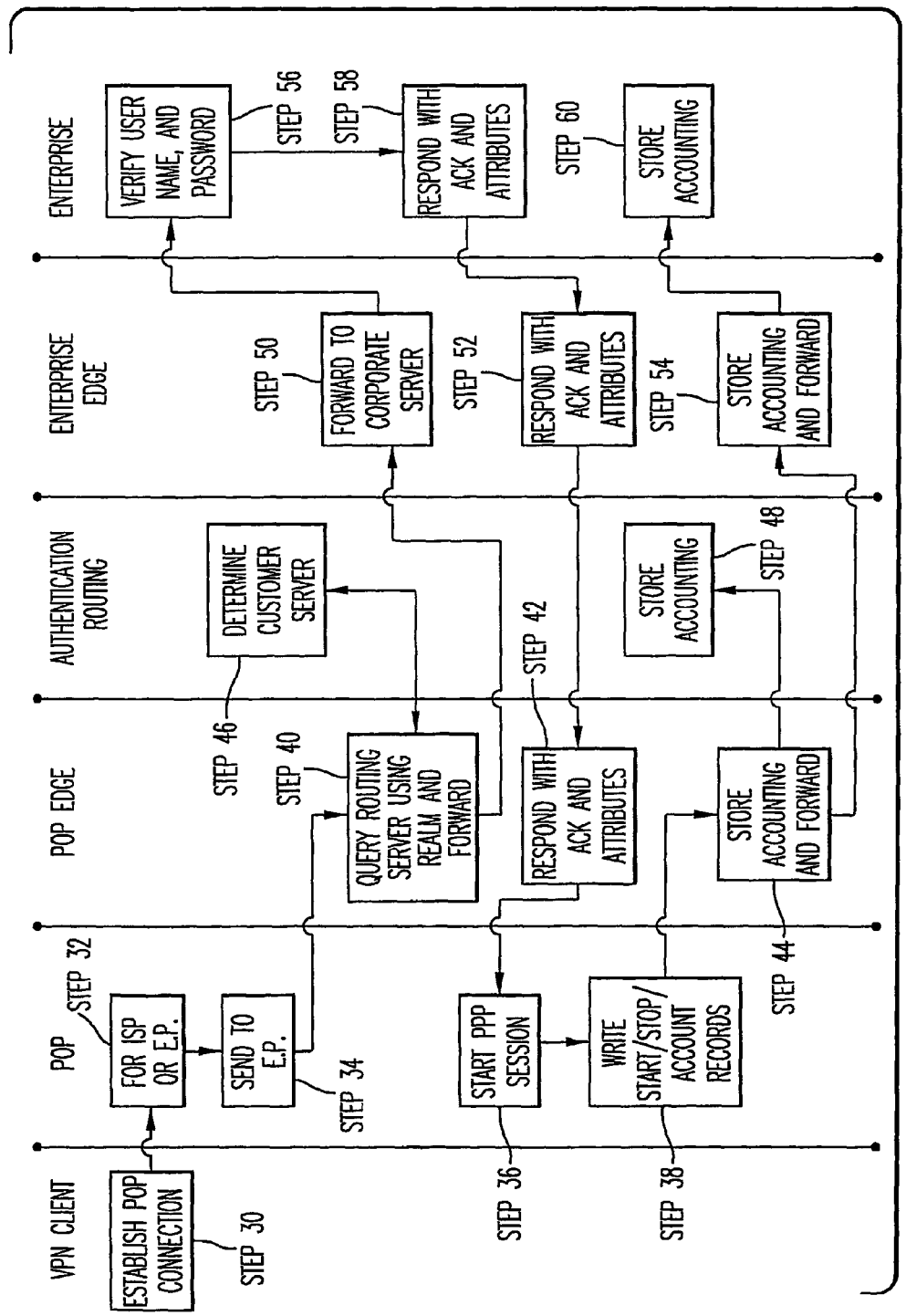
FIG. 8 is an authentication flow chart in accordance with an exemplary embodiment of the invention.
Figure 9:
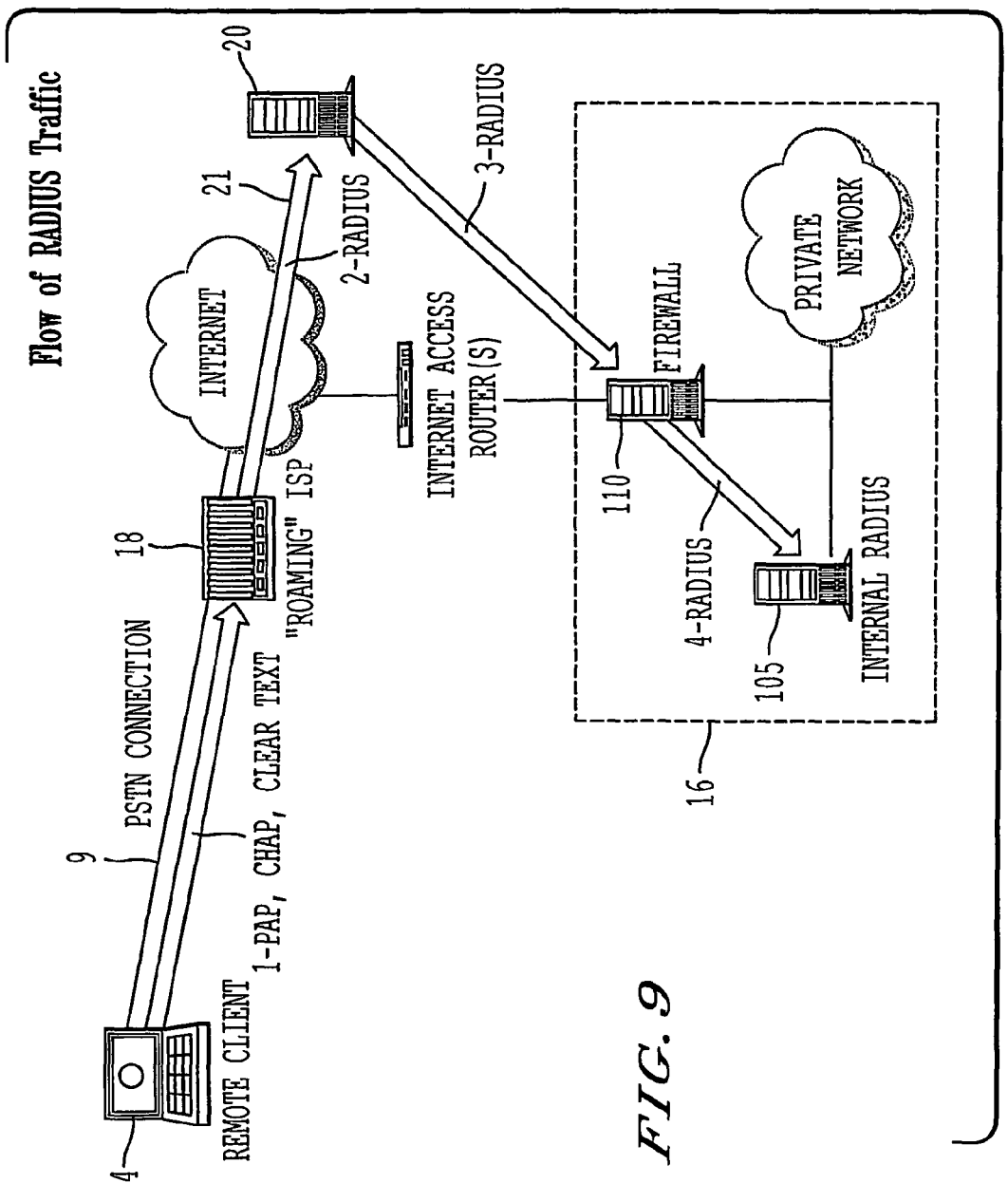
FIG. 9 is a high level network diagram illustrating logical devices employing the steps of FIG. 8.

Referring now to FIGS. 8-9, upon configuration of the connection agent, as discussed above, the remote user 2 launches the remote access client 8 by clicking connect button 34 of the GUI display of FIG. 3 to authenticate the data fields 28 and 30. In the exemplary embodiment, RADIUS is employed for communicating authentication data and accounting information between the Remote data terminal 4 and the public network 9.

Although the RADIUS protocol typically encrypts the password data of field 30 for the authentication communication between the remote data terminal 4 and the enterprise network 16, the user name of data field 28 as well as accounting information is transported in un-encrypted form. In embodiments requiring heightened security, SSL encryption may be employed between the access provider network 18 and an authentication process server or "RADIUS server" 105 (See FIG. 9) of the enterprise network 16. For example, SSL encryption may be enabled at the authentication process server 105 at the premises of the enterprise network 16. Where the enforce platform 20 is connected to a variety of tier 1 providers, using routing techniques, authentication traffic can be confined to such a backbone, many tier one backbones are as secure as the PSTN network.

Typically, it is viewed as a relatively low risk having the RADIUS traffic traverse the public Internet. A perceived risk is that once a user name can be determined by snooping the data exchange with known techniques, brute force methods and cracking programs can be utilized to guess passwords, to gain unauthorized access to the enterprise network 16. Thus, in an alternative embodiment, a static repository may be employed for Internet access user names and passwords that are not similar to the normal user names and passwords of enterprise network 16. If one of these user names or passwords were to be compromised, the risk is only the theft of Internet access, access to corporate resources via VPN link could then be more strongly authenticated with one-time passwords on hard or soft tokens.

Moreover, a variety of authentication methods may be employed in the exemplary embodiment of the invention, including but not limited to Challenge Handshake Authentication Protocol (CHAP) only, CHAP and password Authentication Protocol (PAP), and PAP only. When the end authenticating entity (enterprise RADIUS) is a system that uses non-MD5 encryption for the CHAP encryption method (such as Windows NT, which uses DES), CHAP authentication is not compatible. This means that if the remote access client 8 is using Windows NT or another platform using proprietary password encryption schemes, the authentication method has to revert to PAP.

The remote access client 8 accounts for this in two ways, if the enterprise RADIUS server 105 supports CHAP and the enterprise network 16 requires CHAP support, a remote access client 8 is distributed to a remote user 2 including the contact indicia for CHAP-only POPs, the CHAP and PAP POPs, and PAP POPs. Such an embodiment of the remote access client 8 would offer CHAP security for a portion of the POPs. If the enterprise RADIUS server 105 does not support CHAP, a remote access client 8 would be distributed to include all CHAP-only, PAP/CHAP and PAP-only POPs. The phonebook 7 would be formatted to actuate terminal scripts (these run minimized on the GUI of remote data terminal 4 and are non-intrusive) for the CHAP-only POPs.

As shown in FIG. 8, an exemplary RADIUS data flow diagram includes vertical columns for designating the transfer of data between the remote access client 8, access provider 18 and enterprise network 16 as processed by corresponding logical devices of the POP network and enterprise network 16. At step 30, the remote access client 8 initiates a connection to the POP of choice in accordance with the configuration of the connection agent. Authentication information supplied by the remote user 2 is sent to the POP via CHAP, PAP or a terminal window, depending on the POP technology. At step 32 the POP18 determines whether the RADIUS data is for accessing the ISP or for relay to the enforce platform 20 for accessing the enterprise network 16. Where the RADIUS data is for the authentication server 105, the RADIUS data, the user, the user name, password and "roaming domain" are sent thereto. As described above, the password in the transaction is encrypted using the RADIUS shared secret agreed upon by the enterprise network and enforce platform 20 at the outset of the provider agreement.

Utilizing the roaming domain, the access provider network 18 will determine where to forward the authentication information in step 40 and forward the request to the firewall 14 of the enterprise network 16. At step 50, the customer firewall will pass the RADIUS request to the RADIUS server 105 and, providing a good user name and password were supplied at step 56, the RADIUS server 105 will, at step 58 and 52 pass an accept back to the enforce platform 20, which will in turn complete the RADIUS transaction with the originating access provider 18 at step 42. At this point, the remote data terminal 4 will initiate pre-processes in accordance with the policy file 7, and assuming the processes are satisfactory, the remote data terminal 4 will establish a Point to Point Protocol (PPP)

session at step 36 with the POP 18A. The remote access client 8 is provided with a public IP address, gateway, and DNS information from the POP 18A.

Throughout the RADIUS connection process and connection lifetime, data pertaining to the connection is captured, normalized and stored. In the exemplary embodiment, two types of data captured and stored are discussed below. As stated in the discussion of the remote access client 8 above, experience data of a remote user 2 is uploaded on successful connects to the enterprise network 16, reflecting the experience of the remote user 2 for every connection attempted and/or established by the remote access client 8. The data is stored in flat files of the enforce platform 20 and utilized in conjunction with monitoring tools for proactive scanning, and then loaded into a database of the enforce platform 20. The data is then available for ad hoc reporting and used to generate regular performance reports for administrators of the enterprise network 16.

At step 38, RADIUS accounting information is generated for each authenticated session. This data is normalized and loaded into an Oracle database. Once uploaded in steps 44 and 48, the accounting data is stored in step 60 and available for ad hoc and scheduled reporting, and subsequently rated and sent to the billing systems of the enterprise network 16.

C. Front-End

Figure 10:
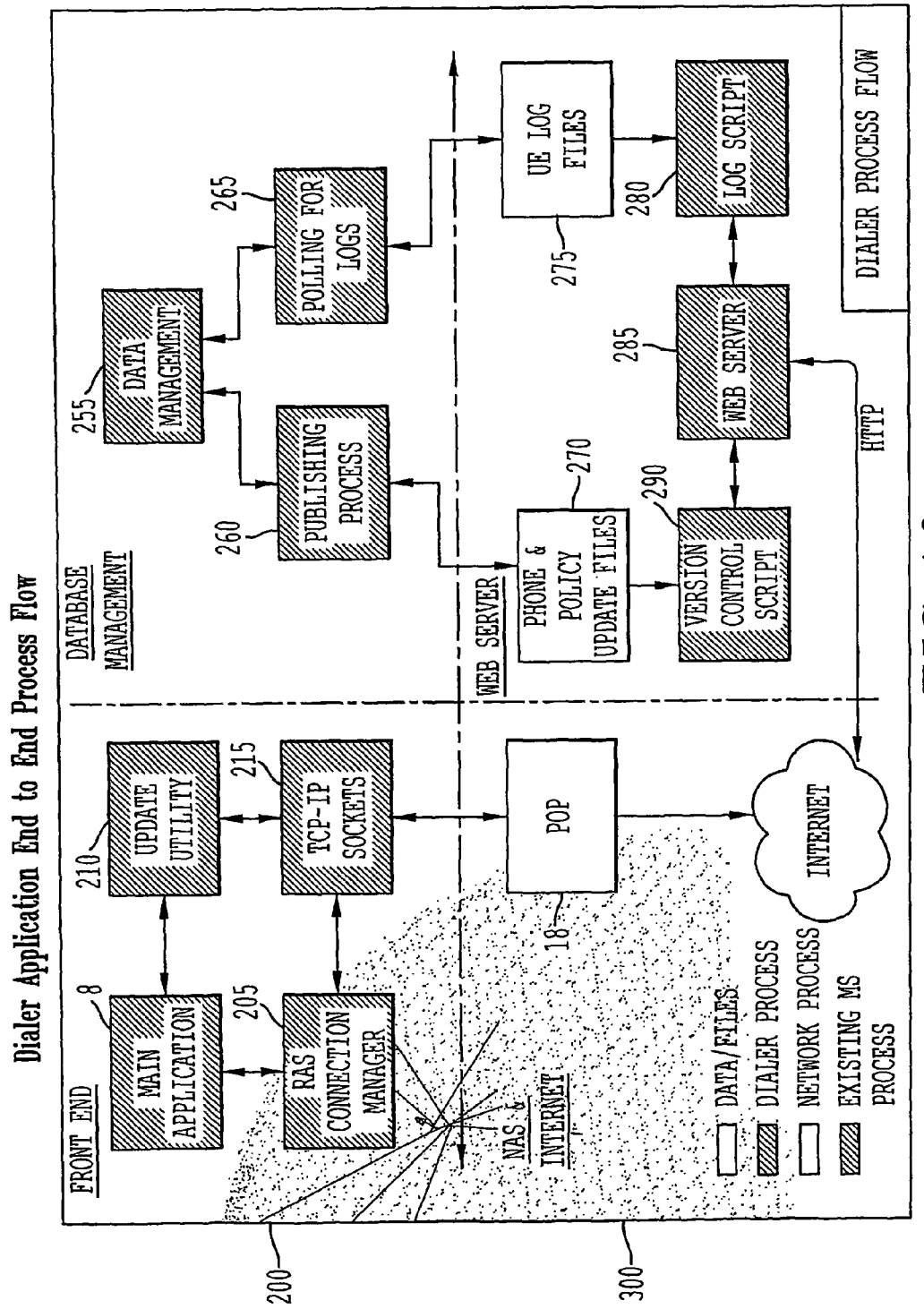
FIG. 10 is a flow chart of an end to end process of a front-end of the remote access client system in accordance with FIG. 1.
Figure 14:
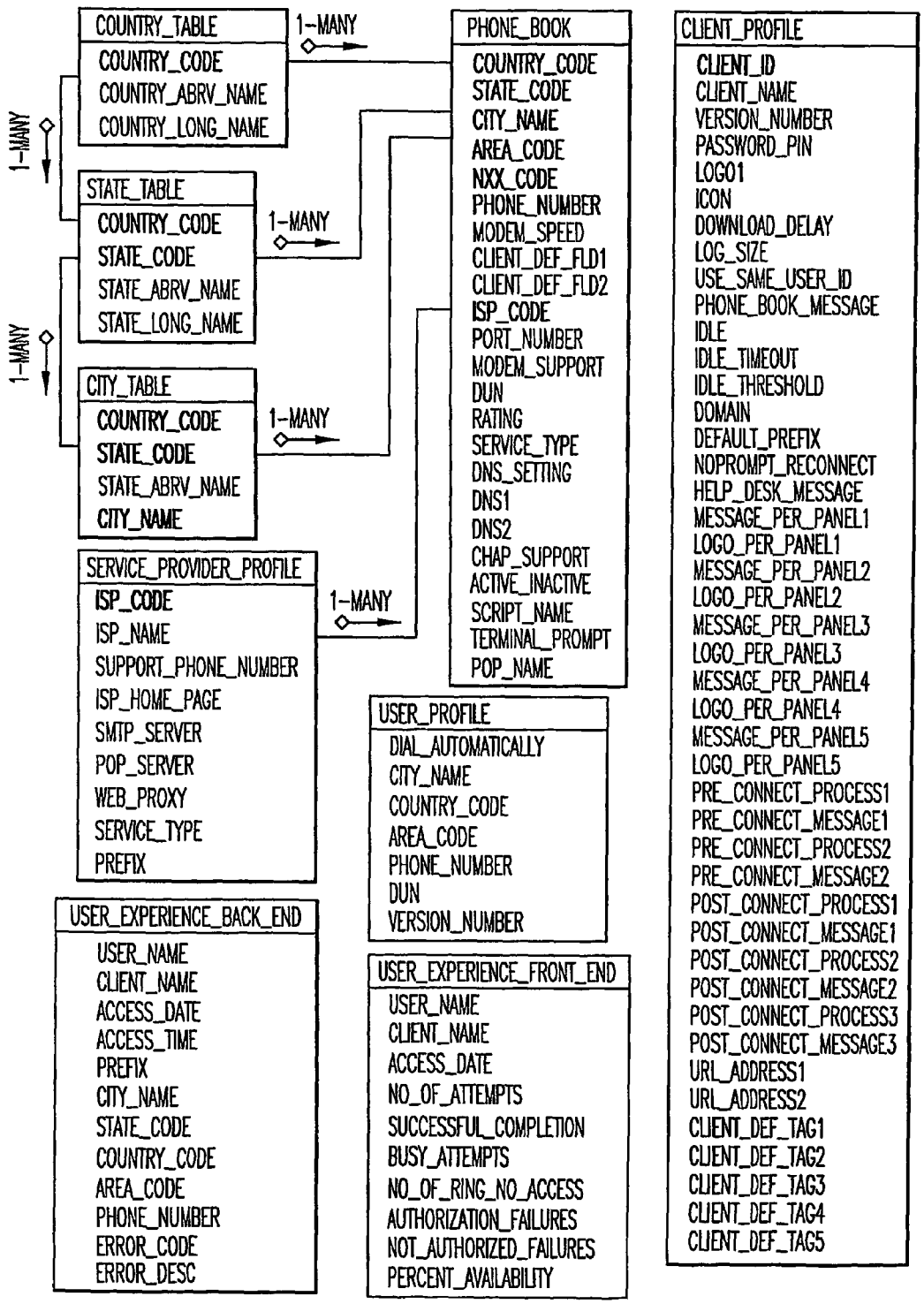
FIG. 14 is a logical data model of the front-end of FIGS. 10-11 in accordance with an exemplary embodiment of the invention.

Referring now to FIG. 10, the remote access client system platform front-end 200 is shown in an end to end process flow. Front-end resides on the desktop of the remote data terminal 4 having an update utility 210, remote access client 8, sockets 215 and RAS manager 205. In the exemplary embodiment, remote data terminal 4 utilizes a Microsoft® modem interface (RAS) 205 for sockets 215. The Front-End 200 may be developed using object design, Visual Studio® C++ 6.0 and Microsoft® scripting language for example. The Front-End application (remote access client 8) of the exemplary embodiment interfaces with the existing Microsoft Remote Access Support Application Protocol Interface (RASAPI) 205 and is designed to run on Windows 95, 98, 2000 and NT 4.0 based operating systems. The front end 200 may be designed to detect which OS it is running on and execute the appropriate objects that support that particular OS. A logical data model of front-end 200 is shown in FIG. 14 and corresponding physical data models of FIGS. 16-18 are best understood when read in conjunction with the foregoing description of FIGS. 10-11.

A database management component 255 stores and maintains the phone book and client profile data. An exemplary client profile is shown in FIGS. 19-21B for illustrating the component function summary is as follows:

The main data store 270 for the phone book, client profile and configuration data of the exemplary embodiment reside on a SUN Solaris® server running a database such as Oracle® 8.i having a publishing process 260 and polling process 265. The data management back-end process updates and maintains the remote access client data files by way of control script 290, log script 280 and log files 275 for delivering the updates to the web server 285 of the remote user 2.

Figure 11:
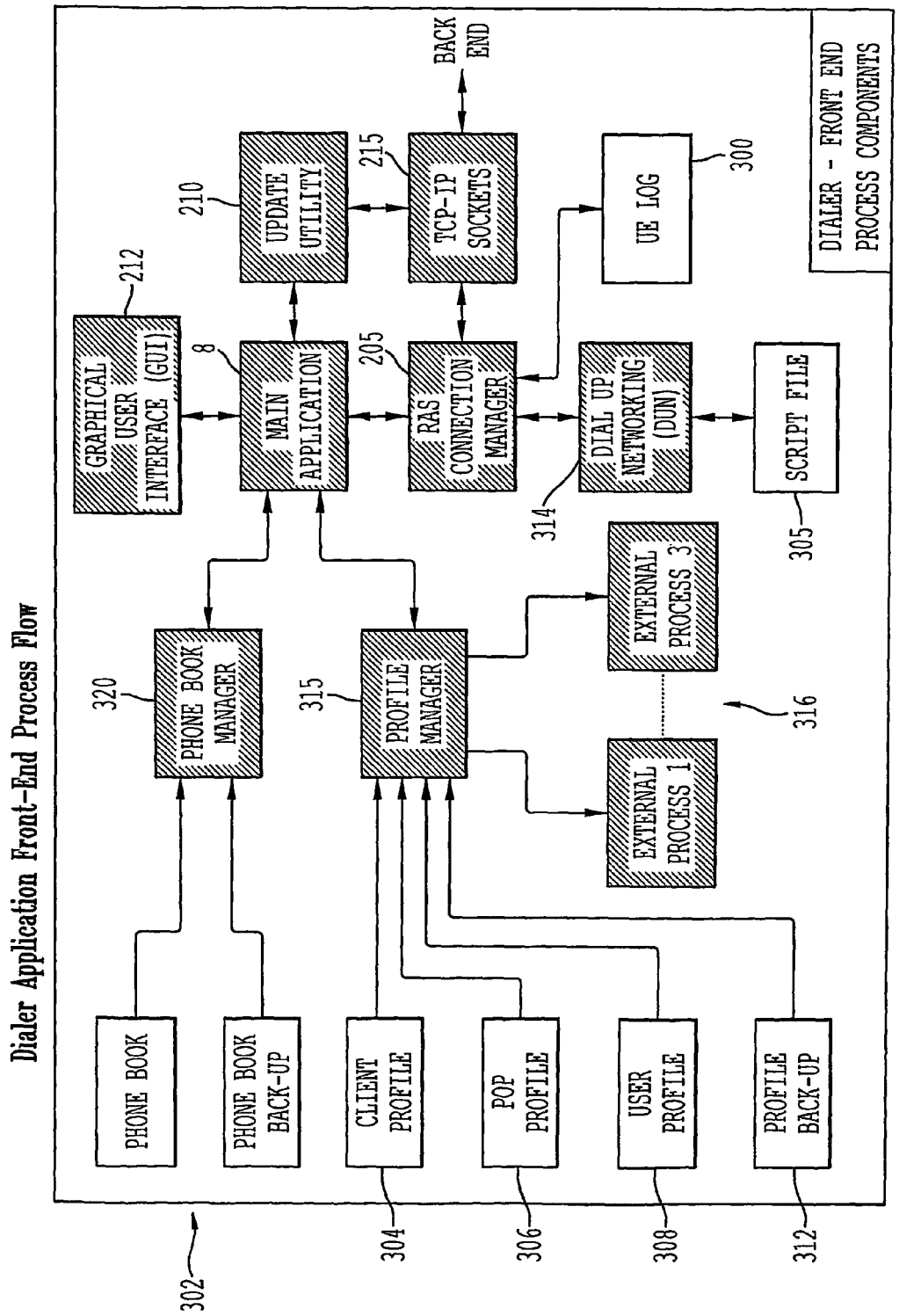
FIG. 11 is a flow chart of a front-end process flow of the remote access client system in accordance with FIG. 1.

As shown in FIG. 11, the front-end 200 has a process flow for communicating with the POP 18 web server 18A via the HTTP protocol to download file updates for phone book 6 and policy file 7 and also upload user experience log data 300 via scripts 305. Phone book data 302, client profile 304, POP profile 306, and user profile 308 are managed by a corresponding phone book manager 320 or profile manager 315 for downloading to remote access client 8. Profile manager 315 also manages external processes 316. The GUI 212 is initiated and modified in accordance with the configuration of the client profile, such modifications include client logo, client message, UID etc as shown in FIGS. 19-22. The GUI reads the local phone book file and displays it via the GUI. The remote user 2 may search throughout the phone book as shown in the GUI display of FIG. 5. The remote user 2 selects contact indicia for a POP 18A and the RAS connection manager 205 opens a TCP/IP socket 215 to the POP 18A via the RASAPI interface. The connection stages and dial-in features (user experience data) are logged at log 300 and upon initiation, pre-processes specified (see below) are started on the desktop.

The exemplary data based management architecture provides the necessary functions and the capability to refresh/update the master phone book 302 with new POP 18A phone/port information. This information in turn will be used to publish, where applicable, customized phone books by on the basis of an enterprise network 16 or remote user 2. The maintenance function will also process the user experience data collected by the remote access client 8. To support the remote access client 8, pseudo-static data will be maintained by the maintenance function (e.g., state, exchange tables).

Upon satisfactory completion of the pre-processes, a PPP connection with access provider 18 is established and CHAP authentication takes place while post-processes are started on front end 200. An HTTP request is sent to the web server 285 (as identified in the client profile). The HTTP request specifying a script to be executed on the back-end and also includes the version number of the phone book and client profile as parameters. The web server executes the version control script 290 to compare the version numbers between the local files and the file stored on the web server. In this way, an HTTP response includes either phone book or client profile updates or the whole phone book and client profile if a consecutive update beyond a predetermined number. The update utility 210 of front-end 200 receives the files from the data update request and parses the files for new/deleted or changed phone book and/or client profile entries and the updates are passed to the phone book manager 320 and client profile manager 315. In the exemplary embodiment, the phone book and client profile are backed-up at 312 and 302 respectively. The phone book manager 320 interacts with the client profile manager 315 and in turn updates the respective flat files 6 and 7.

User experience data collected form the front-end 200 is sent to the web server 285 as an HTTP request. The log script 280 is initiated by the web server 285 for storing the unique log file in log 275. Data management 255 polls for logs at regular intervals for processing.

D. Back-End

Figure 12:
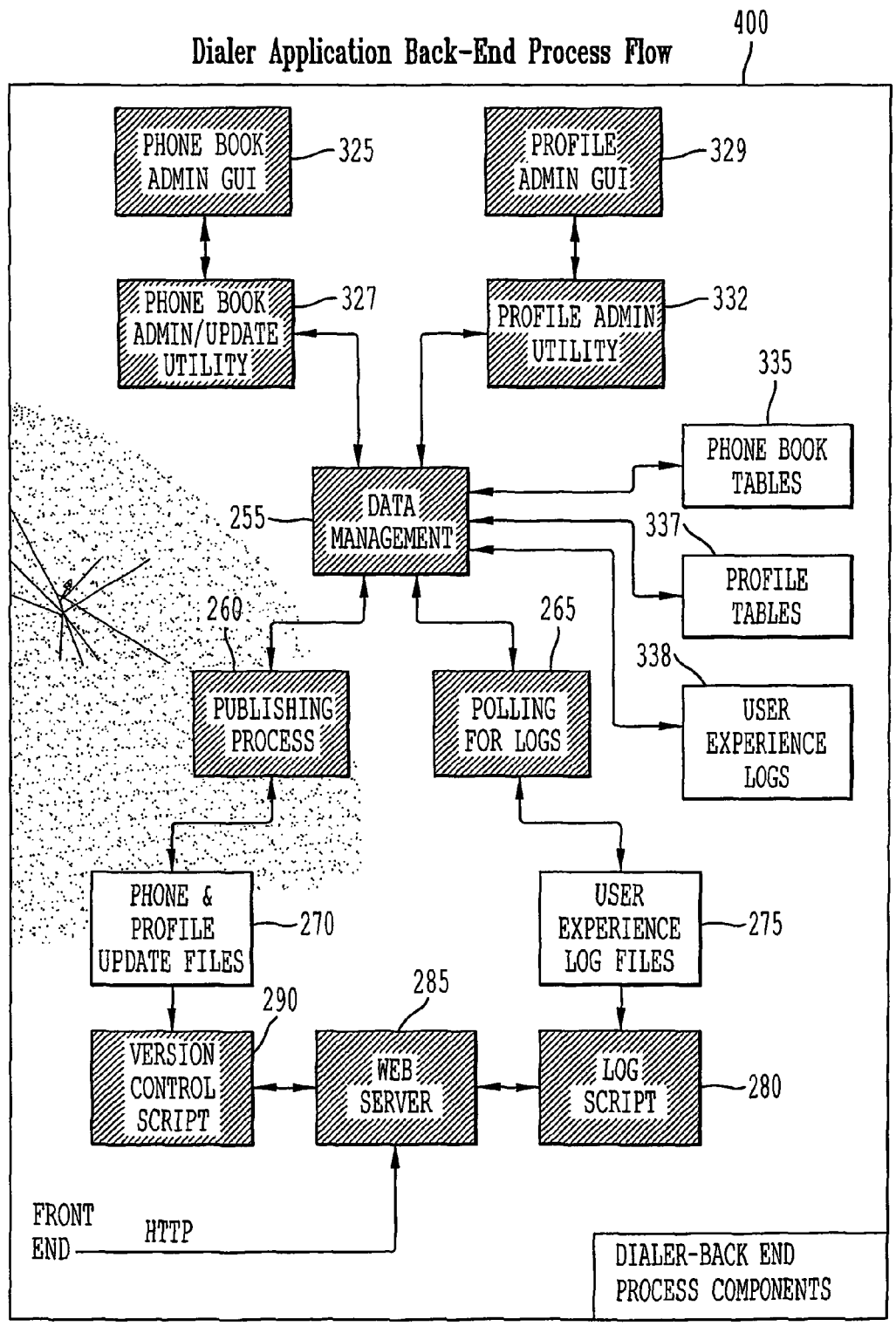
FIG. 12 is a flow cart of a back-end process flow of the remote access client system in accordance with FIG. 1.

Referring now to FIG. 12, the remote access client system platform back-end 400 is shown in an end to end process flow. Data Management 255 receives new files or file updates for both phone books and client profiles. The process compares such data against existing phone book and client profile tables in the database for detecting variations therein to update the tables. Data management 255 extracts custom phone books by client profile (update transactions and fall update) and places the files on the web server. Front-end 200 accesses the files upon connection to the enterprise network 16.

Personnel of the enforce platform 20 add/delete/changes items in the phone book and client profiles using the phone book admin GUI 325 and the client profile GUI 329 respectively. Data management then update the database tables 335 and 337. Data management 255 extracts the custom phone books by client profile (update transactions and full update) and places the files on the web server, front-end 200 accesses the files upon connection to the enterprise network 16. User experience data is stored in log 338 for analysis by data management 255 for updating POP ratings in the Phone book.

Figure 13:
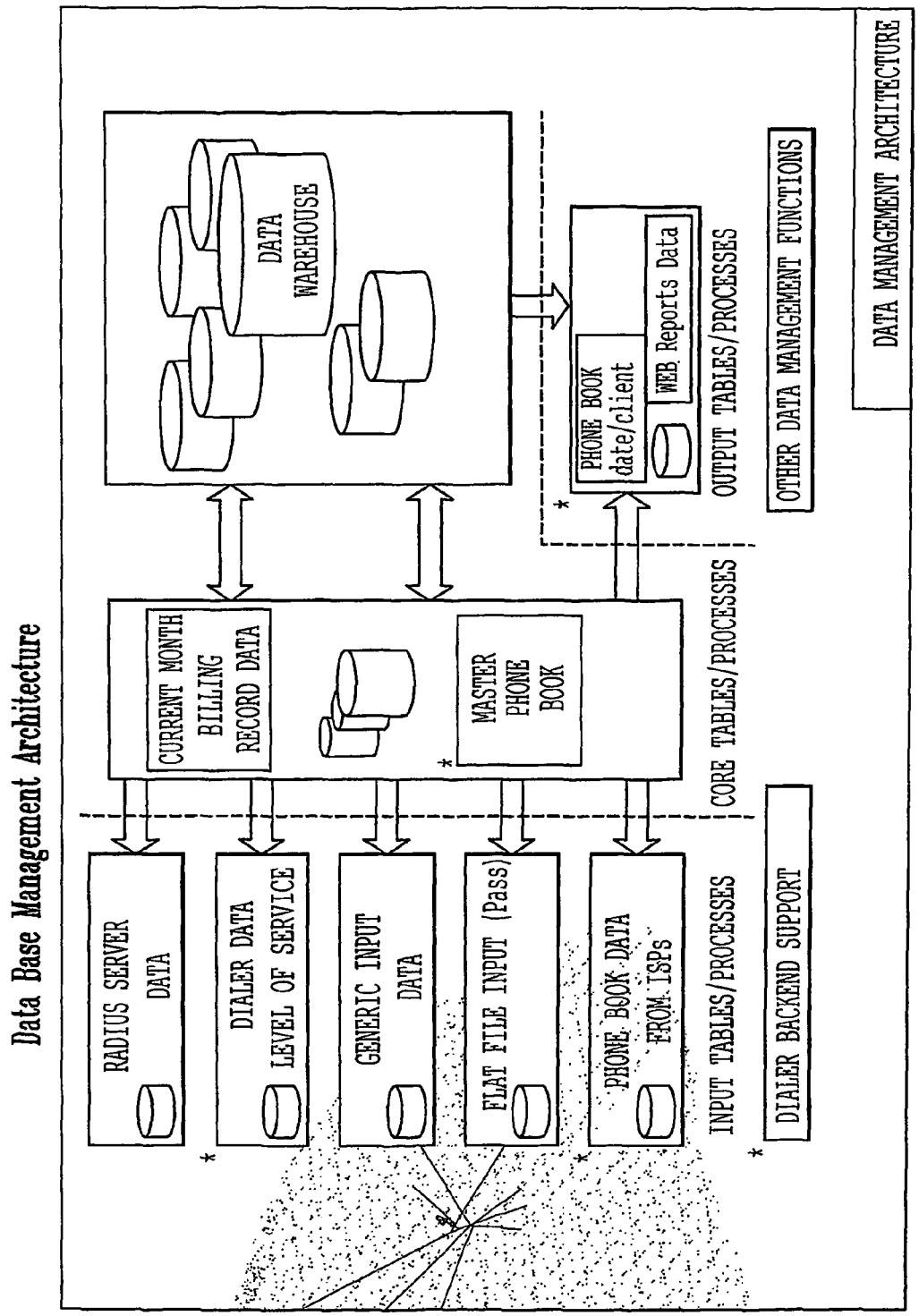
FIG. 13 is a high level block diagram of a database architecture of the enforce platform of FIG. 1.

A database management architecture is shown in FIG. 13 in accordance with an exemplary embodiment of the invention. The interface to the Oracle® instance hosting the phone book and the user experience/level of service data will be provided by a MS access database. Connectivity from the remote data terminal 4 to the UNIX Oracle environment will be accomplish via ODBC drivers.

III. Pre-Processing/Post Processing Methodology

In the exemplary embodiment of the invention, in addition to VPN client, the remote access client 8 can be configured to launch one or more of applications 10 before a connection (PPP) for enabling a policy compliant VPN link with the enterprise network 16. These applications or "pre-processes", are specified as part of the policy file 7 or "client profile." Configuring pre-process functionality involves setting up the pre-process fields in the client profile 7 for the specific remote access client 8. Likewise, the exemplary embodiment can be configured to launch one or more processes after a successful connection (PPP) for enabling a policy compliant VPN link with the enterprise network 16. These applications, called post-processes, are also specified as part of the client profile 7. Configuring post-processes involves setting up the post process fields in the client profile 7 for the specific remote access client 8.

In the exemplary embodiment, the remote access client 8 monitors specific ones of applications 10. Monitoring of applications 10 involves, launching an application, and ensuring that the application is "alive" or functioning as expected during the connection of the remote access client 8 to the POP 18A. If the application is not alive, the remote access client may be configured to terminate the attempted connection prematurely. Similarly, the exemplary embodiment may continually monitor such applications after PPP (i.e., post-process) frequently "polling" for the status of an application at a certain specified time interval. This time interval is customizable as part of a setting in an INI file of the remote access client 8.

In general, monitoring involves, polling for the existence of that process handle in the memory. If the present invention monitors only for the existence of that application's process handle in the memory, it is termed Simple Monitoring. Conversely, Intelligent Monitoring is characterized by the remote access client 8 monitoring an application status through an interface such as an API. In such implementations of applications 10, the present invention uses such an interface to monitor the internal status of the application processes.

A pre-process or post-process of remote access client 8 can be a plurality of types, such types include parent process (PP), daughter process (DP), simple monitored process (MP), and "intelligent" monitored process.

For example, if a pre-process is setup as a DP process, the remote access client 8 waits for the DP process to terminate before continuing execution. An example of a DP post-process setting includes:

DP C:\Windows\notepad.exe

Accordingly, if a process is setup as a PP process, the remote access client 8 launches the PP process and continues execution. In this way, in the PP example, the remote access client 8 does not wait for the process to terminate before continuing execution.

An example PP post-process setting includes:

PP C:\PROGRA~1\Nortel\Extran~1.exe-u #MP-p #MP

Note that if a post-process is setup as a DP process, the exemplary embodiment of the present invention 'assumes' it to be a PP type.

If any of the post-processes is setup as Wn type (where n is number of minutes ranging from 1 to 9), the present invention, launches the post-process, waits for n minutes to elapse, and then starts monitoring the process in the background (i.e., daemon). An example Wn post-process setting includes:

W5 C:\PROGRA~1\Nortel\Extran~1.exe-u #MP-p #MP

MP process is equivalent to setting up a Wn process with 5 minute as the wait time, viz., W5 process.

An example of an MP post-process setting includes:

MP C:\PROGRA~1\CiscoV~1\ISPDIA~1.EXE

The Nortel® Extranet client post-process that is setup with the % ld options is an example of the intelligent monitored processes. It allows the present invention to monitor for an established VPN tunnel. A process can be setup as a PP, MP or a Wn type for intelligent monitoring.

If such a post-process is setup, the remote access client 8 launches the process, waits for n minutes, if necessary, and then starts monitoring the process.

An example of the Extranet Intelligent monitored process includes:

PP C:\PROGRA~1\Nortel\Extran~1.exe-u #MP-p #MP-m % ld-h % ld

Note that the above example is equivalent to:

W5 C:\PROGRA~1\Nortel\Extran~1.exe-u #MP-p #MU-m % ld-h % ld

The polling interval determines how frequently the remote access client 8 looks for the monitored processes' state. The polling frequency for the monitored processes can be specified as part of an .ini file of the remote access client 8. This setting (called MPTO), sets the common polling interval for all the monitored processes. If this value is not set in the .ini file of the remote access client 8, it reverts to a default setting, in the exemplary embodiment the default setting is 5 minutes.

The pre-process and post-process setting in the client profile 7 includes support for "passing through" the user ID and password that the remote user 2 provides to data fields 28 and 30 of FIG. 4 automatically. The pass through setting may be used in conjunction with those pre-processes or post-processes that need a user id and password as an input and that can read them as command line parameters. This allows for launching pre-processes or post-processes seamlessly without the user having to key in the user id and password again into a pre-, or post-process application window.

An example process setting that uses user ID/password pass through feature includes:

PP C:\PROGRA~1\Nortel\Extran~1.exe-u #MP-p #MU-m % ld-h % ld

In the above example, before launching the process, the present invention replaces the sub-strings #MP and #MU with the user id and password that were entered into the fields in the main window of the present invention. Of course, where such a feature is not desirable, the pre-process and post-process settings in the client profile includes support for prompting the user for entering user ID and password successively to launch designated applications.

Prior to launching the process, the present invention displays a dialog to the user, where the user can specify a user id and password. The present invention then passes the entered user id and password through to the process as command line parameters. An example process setting that prompts the user for user id and password initialized with empty values includes:

PP C:\PROGRA~1\Nortel\Extran~1.exe-u #P-p #U-m % ld-h % ld

As described above with reference to the GUI display of FIG. 4, before launching the process, the remote access client 8 displays a dialog having user ID/password fields. Once the remote user 2 clicks "OK", the remote access client 8 receives the values entered into fields 28 and 30. The remote access client 8 uses the User ID entered in the dialer and replaces #U sub-string in the process string with the value from the data field 28. Similarly, the remote access client 8 replaces #P with the password value from the data field 30, and proceeds to launch the pre-process designated in the client profile 7.

A further example of a process setting that prompts the remote user 2 for user ID and password initialized with values saved at launch include:

PP C:\PROGRA~1\Nortel\Extran~1.exe-u #p-p #u-m % ld-h % ld

In the above example, before launching the process, the remote access client 8 displays a dialog having user ID/password fields. The dialog may also contain a save check box field for storing the data entered to the fields. The remote access client 8 then initializes the user ID field in the dialog with the user ID saved in the registry for that pre, or post-process, likewise, the remote access client 8 initializes the password field in the dialog with the Password value saved in the registry for that pre, or post-process. Once the remote user 2 clicks OK, the present invention takes the values entered into the fields. The remote access client 8 uses the user ID entered in the dialer and replaces #u sub-string in the process string with the value from the dialog. Similarly the remote access client 8 replaces #p sub-string in the process string with the password value from the dialog and then the remote access client 8 attempts to launch the process.

In broadband applications, remote access client 8 may run minimized and continually check for the presence of monitored applications, and disallow the execution/connection of a specified VPN client(s) or other specified process from running, embodiment is employed regardless of connectivity method. This would enable remote access to affect policy regardless of type of transport or if that transport is initiated by remote access client 8. This embodiment is employed if remote access client 8 is running as a service or running at startup mode. The policy enforcement engine component of this embodiment is completely separate form the connect ion agent component and interface. They should be able to interact as necessary. An additional requirement is to disallow network connectivity from any connection if the policy conditions as not met. This would extend the access control to Wireless, Broadband and like transports.

A. Application Example

The following example, is provided for explaining the exemplary embodiment of the invention utilized in conjunction with a workstation firewall 12 such as BlackICE® which is manufactured by Internet Security Systems of Atlanta, Ga. The firewall 12 is a PC intrusion detection (firewall) software which runs as a background process on the remote data terminal 4 having the remote access client 8 installed thereon. For a given enterprise network 16, the firewall 12 will be assembled, according to the enterprise specific policy, into an installable .EXE file and the remote access client 8 installable will have the BlackICE Agent software bundled into it, as part of an application suite. In the exemplary embodiment, the remote access client 8 installable is modified to make use of the BlackICE firewall 'silent' installation feature. In this way, when a remote user 2 installs the remote access client 8, the dialer installation program will perform a 'silent' installation of the BlackICE firewall 12. Of course, the firewall 12 is bundled with the remote access client 8 installable only for those enterprise networks 16 that have identified such a need. In addition to installing the firewall 12, the remote access client 8 installable will also place the firewall installable, BI.EXE, and DISFIRE.EXE which is a utility program for disabling firewall monitoring using DISFIRE.EXE, into the a folder of remote access client 8. The installable .EXE name of firewall 12 is specified in the BI.INI file setting, BII (stands for BlackICE Installable). Remote access client 8 uses this setting to determine the name of the installable, in case it has to force an installation of firewall 12. In the exemplary embodiment, the firewall 12 is launched as part of the boot process of the remote data terminal 4.

The remote access client 8 of the exemplary embodiment will provide support for detecting the firewall software on the remote data terminal 4. Based on the status of the firewall on the remote data terminal 4, the remote access client 8 will take certain corrective actions, thereby ensuring the privacy of the user from unwanted network connection traffic prior to PPP and during data transport via an established VPN link. To this end, remote access client 8 will enforce security policies of the client profile 7 based on the contents stored therein which may be periodically updated and specific to an individual remote user 2. The remote access client 8 monitors the status of the firewall 12 before a connection is made and will prevent the establishment of a PPP connection if the firewall 12 is disabled. Moreover, remote access client 8 will terminate an existing PPP connection if the firewall 12 becomes disabled or impaired while the connection is active. In this way, remote access client 8 provides an extra layer of security beyond the security provided by the end user's firewall software.

In the exemplary embodiment, remote access client 8 employs a leveraged API for exchanging data with the firewall 12 during operation for enabling specific features of the firewall 12 in accordance with the client policy 7. On a remote data terminal 4, at any given time, firewall 12 can be in any one of the following states:

(Not Installed) The firewall 12 is not installed on the remote data terminal 4.

(Stopped) The firewall 12 is disabled from performing intrusion detection operation by some means.

(Not Responding) For reasons unknown, firewall 12 is not responding to a query for ascertaining an operating state.

(Running) The firewall 12 is active and performing the intrusion detection function.

Thus, based on BI.INI file setting BIM (BlackICE Monitoring), remote access client 8 of the exemplary embodiment functions to monitor the different states of firewall 12 on the remote data terminal 4 to initiate necessary actions. By way of example:

If BIM setting is set to 1, remote access client 8 will monitor the states of firewall 12.

If BIM setting is set to a 0, remote access client 8 will not monitor firewall 12.

Accordingly, based on the requirements of an enterprise network 16, remote access client 8 will be configured to set the BIM value in the INI file accordingly. In the exemplary embodiment, the remote access client 8 is configured to set BIM to a default value of 0.

In the exemplary embodiment, the remote access client 8 may initiate actions in accordance with table I.

TABLE I

| BlackICE Agent State | Time of detection | Actions taken by remote access client 8, in that order |
| --- | --- | --- |
| Not Installed | On clicking on the 'Connect' button in the | Attempt to install the firewall 12. If successful in installing and the firewall 12 is in a running state, |

TABLE I-continued

| BlackICE Agent State | Time of detection | Actions taken by remote access client 8, in that order |
|---|---|---|
| | GUI of FIG. 4 | continue with the connection. If unsuccessful in installing, Log a user exp. event; Display a message to the remote user 2 in area 42 of the GUI of FIG. 4 that firewall 12 is not installed and contact Help Desk for support; On acknowledging the message, the remote user 2 is placed back in GUI of FIG. 4. Help desk can direct the remote user 2 to use the DISFIRE.EXE utility to disable the firewall 12 monitoring temporarily. The help desk can also instruct the remote user 2 to run the firewall 12 installable, BI.EXE that is placed in a folder of remote access client 8. |
| Stopped | While connected, at regular intervals of time. | Display a message to the remote user 2 that firewall 12 is not active and contact Help Desk for support. On acknowledging the message, the network connection is disconnected and the remote user 2 is placed back in the GUI display of FIG. 4. |
| Not Responding | While connected, at regular intervals of time. | Display a message to the remote user 2 that firewall 12 is not active and contact Help Desk for support. On acknowledging the message, the network connection is disconnected and the remote user 2 is placed back in the GUI display of FIG. 4. |
| A Running | While connected, at regular intervals of time. | Do nothing - continue with the connection. |

An executable called disable firewall monitoring (DISFIRE.EXE) will be distributed along with the remote access client 8 to disable the monitoring of firewall 12 for one session. On running the DISFIRE.EXE, DISFIRE will display a 'disclaimer' message to the remote user 2. On acknowledging the message with an OK or Yes button, the monitoring of firewall 12 will be disabled. Thus, to disable monitoring of firewall 12 the remote user 2 may use DISFIRE.EXE as in certain situations, it may be necessary for the remote user 2 to get connected to the enterprise network 16 without monitoring of firewall 12, for a limited time. This time may be tracked via user experience data such that a flag can be set in the client policy for disallowing this feature upon repeated use.

A registry setting, DBIMO (Disable BlackICE Agent Monitoring Once), will be used to accomplish the disabling for one session. If DBIMO setting is set to 0 in client policy 7, remote access client 8 will monitor the BlackICE Agent states. If DBIMO setting is set to a 1, remote access client 8 will not monitor firewall 12 for just one session. If remote access client 8 determines that this is set to 1, it will reset it to a 0, so that the next time the remote user 2 attempts to connect to the enterprise network 16, monitoring of firewall 12 is enabled.

The remote access client 8 user experience (UE) records will be used for reporting the status of firewall 12. The status of firewall 12 will be reported only for remote users 2 who are using a remote access client 8 integrated with firewall 12. In the exemplary embodiment, states of the firewall 12 reported as part of the UE will be as follows:

Firewall 12 not installed, remote access client 8 only deployed;

Firewall 12 installed, Firewall 12 active;

Firewall 12 not installed, security policy manually disabled;

Firewall 12 installed, security policy manually disabled;

Firewall 12 installed, user disconnected—firewall 12 not responding;

Firewall 12 installed, user disconnected—firewall not active;

Firewall 12 installed, remote user 2 disconnected—firewall 12 uninstalled during connection;

Firewall 12 installed, remote user 2 disconnected—unknown firewall 12 Status

Remote user 2 denied access—firewall 12 not responding

Remote user 2 denied access—firewall 12 not active

Remote user 2 denied access—unknown firewall 12 status

Remote user 2 denied access—firewall 12 not installed

Table II shows the fields in the UE (user experience), in the order of their appearance in accordance with the exemplary embodiment. The field, firewall status code, as shown in the last row of the table, will be the new field that would be added to the record for the purpose of reporting the state of firewall 12.

TABLE II

| Field Name | Field Length | Field Description |
|---|---|---|
| User Name | 25 | This is the data that is entered into the remote access client 8 in the user ID field 28. |
| Client ID | 5 | This is a unique number assigned by the enforce platform 20 to manage user experience data. |
| Port Number | 10 | A unique identifier that identifies the phone number used during the connection. |
| Prefix | 25 | This is the prefix to the user ID that was used for connecting to the network |
| Domain | 50 | This is the suffix to the user ID that was used for connecting to the network. Usually, this is the name of the enterprise server that does the user authentication. |
| Modem Type | 100 | This is the actual name of the installed modem being used by the connection. |
| Connect Speed | 8 | When successfully connection was established, this is the negotiated modem speed determined at the time of connection. Otherwise, this is the modem speed that the phone number (POP) supports. |
| User Log Version | 7 | This field identifies the record type for the database load process. |
| Dialer Version | 10 | This is the version of the remote access client 8 that generated this UE record |
| Platform | 25 | This is the operating system in use during the connection. |
| Dialer SW Version | 7 | This is the version of the software that is in use (from the exect.txt file in the dialer folder) |
| Phonebook Version | 10 | This is the version of the phonebook that is in use. |
| Phonebook Update Version | 7 | This is the update version of the phonebook that is in use. |
| Client Version | 7 | This is the version of the client profile 7 that is in use |
| Access Date | 10 | This is the date on which the connect attempt was made, per clock on PC 5. |
| Access Time | 8 | This is the time at which the connect attempt was made, per clock on PC 5. |
| Connect Date | 10 | This is the date on which the connection was made, per clock on PC5. |
| Connect Time | 8 | This is the time at which the connection was made, per clock on PC5. |
| Authenticated Date | 10 | This is the date on which the remote user 2 was authenticated successfully, per clock on PC 5. |
| Authenticated Time | 8 | This is the time at which the remote user 2 was authenticated successfully, per clock on PC 5. |

TABLE II-continued

| Field Name | Field Length | Field Description |
|---|---|---|
| Web End Date | 10 | This is the date on which the phonebook etc. download process ended, per clock on PC 5. |
| Web End Time | 8 | This is the time at which the phonebook etc. download process ended, per clock on PC 5. |
| End Date | 10 | This is the date on which the connection ended, per clock on PC 5. |
| End Time | 8 | This is the time at which the connection ended, per clock on PC 5. |
| Error Code | 10 | This is the RAS error code that is returned upon error, cancel or disconnect. |
| Phone Number | 25 | This is the phone number dialed to make the connection. |
| Firewall Status Code | 2 | 0-Firewall 12 installed, firewall 12 active; 1-Firewall 12 not installed, security policy manually disabled; 2-Firewall 12 installed, security policy manually disabled; 4-Firewall 12 installed, remote user 2 disconnected-Firewall 12 not responding; 8-Firewall 12 installed, remote user 2 disconnected-firewall 12 not active; 10-Firewall 12 installed, remote user 2 disconnected-firewall 12 uninstalled during connection; 20-Firewall 12 installed, remote user 2 disconnected-Unknown firewall 12 Status 40-Firewall 12 not installed, remote access client 8 only deployed; 41-Remote user 2 denied access-firewall 12 not responding; 42-Remote user denied access-firewall 12 not active; 43-Remote user denied access-unknown firewall 12 status; 44-Remote user denied access-firewall 12 not installed; |

Of course, while the exemplary embodiment describes a firewall application 10, other applications such as virus protection software are equally applicable to the above description. Moreover, while the remote access client 8 is described as preventing connection (pre-process) and disabling connection (post-process) those skilled in the art will recognize that the policy file 7 may be configured to modify settings and implementations of applications 10. For example, the remote access agent may disconnect from POP 18A after a predetermined number of policy violations only, or prompt a user to perform a policy compliant step before initiating the disconnection.

Obviously, readily discernible modifications and variations of the present invention are possible in light of the above teachings. It is therefore to be understood that within the scope of the appended claims, the invention may be practiced otherwise than as specifically described herein. For example, while described in terms of both software and hardware components interactively cooperating, it is contemplated that the system described herein may be practiced entirely in software. The software may be embodied in a carrier such as magnetic or optical disk, or a radio frequency or audio frequency carrier wave.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A remote access client for enabling communication between a remote data terminal configured to access a public network; and an enterprise network, the communication being by way of a VPN tunnel through the public network, the remote access client comprising:
  a connection agent on the remote data terminal configured to establish, in accordance with a selected carrier of the public network, a connection to a point of presence on the public network; and
  at least one application program interface (API) on the remote data terminal, the remote access client employing the at least one API to exchange data with a predetermined application on the remote data terminal to receive verification of a predetermined status of said predetermined application, wherein said predetermined application is launched by the remote access client in accordance with a client policy of the remote access client, the remote access client enabling the connection agent to establish the connection to the point of presence upon receipt of said verification;
  wherein the connection to the point of presence enables establishment of the VPN tunnel in accordance with a VPN client on the remote data terminal for transporting data between the remote data terminal and the enterprise network across the public network.

2. The remote access client of claim 1, wherein the selected carrier of the public network is one of a plurality of available carriers.

3. The remote access client of claim 1, wherein the client policy is resident in a memory of the remote data terminal and identifies a firewall program as the predetermined application.

4. A remote access client for enabling communication between a remote data terminal configured to access a public network; and an enterprise network, the communication being by way of a VPN tunnel through the public network, the remote access client comprising:
  a connection agent on the remote data terminal configured to establish, in accordance with a selected carrier of the public network, a connection to a point of presence on the public network; and
  at least one application program interface (API) on the remote data terminal, the remote access client employing the at least one API to exchange data with a predetermined application of the remote data terminal upon connection to the point of presence, the predetermined application having been launched by the remote access client prior to the connection to the point of presence in accordance with a client policy of the remote access client, and the at least one API receiving periodic verification of a predetermined status of the predetermined application;
  wherein the connection to the point of presence enables establishment of the VPN tunnel in accordance with a VPN client on the remote data terminal for transporting data between the remote data terminal and the enterprise network across the public network and
  wherein the connection agent terminates the connection to the point of presence upon the absence of said verification.

5. The remote access client of claim 4, further comprising a daemon for actively monitoring the operating state of the predetermined application.

6. The remote access client of claim 4, wherein the selected carrier of the public network is one of a plurality of available roaming carriers.

7. The remote access client of claim 4, wherein the client policy is resident in a memory of the remote data terminal and identifies a firewall program as the predetermined application.

8. A method of enabling communication between a remote data terminal configured to access a public network; and an enterprise network, the communication being by way of a VPN tunnel through the public network, the method comprising:
  launching a remote access client of the remote data terminal, the remote access client having at least one application program interface (API);
  launching a predetermined application of the remote data terminal in accordance with a client policy of the remote access client, the remote access client employing the at least one API to exchange data with the predetermined application to receive verification of a predetermined status of the predetermined application; and
  enabling a connection agent to establish a connection to a point of presence upon receipt of said verification;
  wherein the connection to the point of presence enables establishment of the VPN tunnel in accordance with a VPN client on the remote data terminal for transporting data between the remote data terminal and the enterprise network across the public network.

9. The method of claim 8, further comprising: updating the client policy upon connection to the point of presence.

10. A method of enabling communication between a remote data terminal configured to access a public network; and an enterprise network, the communication being by way of a VPN tunnel through the public network, the method comprising:
  launching a remote access client of the remote data terminal, the remote access client having at least one application program interface (API);
  launching a predetermined application of the remote data terminal in accordance with a client policy of the remote access client, the remote access client employing the at least one API to receive a first verification of a first predetermined status of the predetermined application and to exchange data with the predetermined application;
  enabling a connection agent to establish a connection to the point of presence upon receipt of said first verification, the connection to the point of presence enabling establishment of the VPN tunnel in accordance with a VPN client on the remote data terminal for transporting data between the remote data terminal and the enterprise network across the public network;
  periodically receiving a second verification of a second predetermined status of the predetermined application via the at least one API; and
  terminating the connection to the point of presence upon the absence of said second verification.

11. A non-transitory computer readable recording medium including computer program instructions that cause a computer to implement a method to access a public network; and an enterprise network by way of a VPN tunnel through the public network, the method comprising:
  launching a remote access client of the remote data terminal, the remote access client having at least one application program interface (API);
  launching a predetermined application of the remote data terminal in accordance with a client policy of the remote access client, the remote access client employing the at least one API to receive a first verification of a first predetermined status of the predetermined application and to exchange data with the predetermined application;
  enabling a connection agent to establish a connection to a point of presence upon receipt of said first verification, the connection to the point of presence enabling establishment of the VPN tunnel in accordance with a VPN client on the remote data terminal for transporting data between the remote data terminal and the enterprise network across the public network;
  periodically receiving a second verification of the a second predetermined status operating state of the predetermined application via the at least one API; and
  terminating the connection to the point of presence upon the absence of said second verification.

12. A virtual private network system for accessing a public network; and an enterprise network by way of a VPN tunnel through the public network, the system comprising:
  a remote data terminal including:
    i. a remote access client for enabling establishment of a data communications link for transporting data over a VPN link in accordance with a VPN protocol of a VPN client on the remote data terminal, the remote access client having a connection agent for establishing, in accordance with a selected carrier of the public network, a connection to a point of presence on the public network, and at least one application program interface (API), the remote access client employing the at least one API to exchange data with a predetermined application of the remote data terminal to receive a verification of a predetermined status of said predetermined application, the remote access client enabling the connection agent to establish the connection to the point of presence upon receipt of said verification,
    ii. a policy profile for identifying the predetermined application and the predetermined status, the predetermined application being launched by the remote access client in accordance with a policy in the policy profile, and
    iii. a user experience log for storing at least one connection parameter detailing a connection history between the remote data terminal and a point of presence of an access provider, the connection to the point of presence being established in response to commands from the connection agent for providing the connection upon receipt of said verification, the access provider receiving the contents of the user experience log from the remote data terminal upon connection;
  wherein the connection to the point of presence enables establishment of the VPN tunnel in accordance with the VPN client for transporting data between the remote data terminal to and the enterprise network across the public network.

13. The system of claim 12 wherein upon receipt of said verification, the remote data terminal receives updates from the access provider for altering the contents of the policy profile.

14. The system of claim 12 further comprising: a phone book for providing information of at least one of a country, region, city, phone number, login method, and internet service provider to the connection agent of the remote access client.

15. The system of claim 14, wherein; upon receipt of said verification, the remote data terminal receives updates from the access provider for altering the contents of the phone book.

16. The system of claim 15, wherein the phonebook updates are in accordance with the connection parameters uploaded in the user experience logs.

17. A method of providing access to an enterprise network by way of a public network, for enabling a virtual private network connection between the private network and a remote data terminal via the public network, comprising:

providing an application suite to a remote user of the remote data terminal, the application suite including:

i. a remote access client configuring a VPN link between the enterprise network and the remote data terminal in accordance with a VPN client on the remote data terminal, ii. at least one policy-compliant application, iii. at least one application program interface (API) for use by the remote access client to exchange data with the at least one policy-compliant application to receive verification of a predetermined status of the at least one policy-compliant application, and iv. a phone book including contact indicia for establishing connection to the public network via the remote access client, wherein a policy profile of the remote data terminal is employed for detailing the cooperative execution of the at least one policy-compliant application relative to the remote access client, the at least one policy-compliant application being launched by the remote access client and the predetermined status of the at least one policy-complaint application being verified before establishment of the connection to the public network.

18. The method of claim 17, wherein the application suite includes a utility for uploading user experience data to the public network.

19. The method of claim 17, wherein the application includes a utility for receiving updates to the policy profile from the public network.

20. The method of claim 17, wherein the method further comprises: providing updates to the policy profile to the remote data terminal upon connection to the public network.

21. The method of claim 17, wherein a second predetermined status of the predetermined application is verified before the VPN client is initialized and a VPN tunnel between the VPN client and the enterprise network is established.

* * * * *